US009916917B2

(12) United States Patent
Facinelli et al.

(10) Patent No.: US 9,916,917 B2
(45) Date of Patent: *Mar. 13, 2018

(54) METHOD AND COMPOSITIONS FOR PRODUCING POLYMER BLENDS

(71) Applicant: AdvanSix Resins & Chemicals LLC, Parsippany, NJ (US)

(72) Inventors: John V. Facinelli, Morristown, NJ (US); Clark V. Brown, White Plains, NY (US); David J. Loy, Richmond, VA (US); Robert A. Houck, Jr., Midlothian, VA (US); Dana A. Germain, Midlothian, VA (US)

(73) Assignee: ADVANSIX RESINS & CHEMICALS LLC, Parsippany, NJ (US)

(*) Notice: Subject to any disclaimer, the term of this patent is extended or adjusted under 35 U.S.C. 154(b) by 18 days.

This patent is subject to a terminal disclaimer.

(21) Appl. No.: 15/057,640

(22) Filed: Mar. 1, 2016

(65) Prior Publication Data

US 2016/0225485 A1 Aug. 4, 2016

Related U.S. Application Data

(63) Continuation of application No. 13/833,490, filed on Mar. 15, 2013, now Pat. No. 9,312,047.

(60) Provisional application No. 61/663,220, filed on Jun. 22, 2012.

(51) Int. Cl.
| | | |
|---|---|---|
| *H01B 3/30* | (2006.01) |
| *H01B 19/04* | (2006.01) |
| *C08J 3/20* | (2006.01) |
| *C08J 3/22* | (2006.01) |
| *H01B 3/44* | (2006.01) |
| *C08L 77/02* | (2006.01) |
| *C08J 3/00* | (2006.01) |
| *C08L 77/00* | (2006.01) |

(52) U.S. Cl.
CPC ............ *H01B 3/305* (2013.01); *C08J 3/005* (2013.01); *C08J 3/203* (2013.01); *C08J 3/22* (2013.01); *C08J 3/226* (2013.01); *C08L 77/00* (2013.01); *C08L 77/02* (2013.01); *H01B 3/443* (2013.01); *H01B 19/04* (2013.01); *C08J 2377/00* (2013.01); *C08L 2203/202* (2013.01); *C08L 2205/025* (2013.01); *C08L 2205/06* (2013.01); *C08L 2310/00* (2013.01)

(58) Field of Classification Search
USPC ....................................................... 523/351
See application file for complete search history.

(56) References Cited

U.S. PATENT DOCUMENTS

| | | |
|---|---|---|
| 4,391,936 A | 7/1983 | Waggoner |
| 4,448,934 A | 5/1984 | Weaver |
| 4,729,862 A | 3/1988 | Salatiello et al. |
| 4,945,129 A | 7/1990 | Mason et al. |
| 5,236,645 A | 8/1993 | Jones |
| 5,242,975 A | 9/1993 | Modic |
| 5,340,884 A | 8/1994 | Mills et al. |
| 5,626,662 A | 5/1997 | Urban |
| 5,723,522 A | 3/1998 | Bergmann |
| 5,726,278 A | 3/1998 | Kenmochi |
| 5,747,560 A | 5/1998 | Christiani et al. |
| 5,759,925 A | 6/1998 | Ballard et al. |
| 5,763,084 A | 6/1998 | Michels et al. |
| 5,800,746 A | 9/1998 | Jones et al. |
| 5,833,893 A | 11/1998 | Jones et al. |
| 5,834,089 A | 11/1998 | Jones et al. |
| 5,945,469 A | 8/1999 | Heath et al. |
| 5,961,734 A | 10/1999 | Kight et al. |
| 6,022,613 A | 2/2000 | Ren |
| 6,120,718 A | 9/2000 | Kotek et al. |
| 6,149,850 A | 11/2000 | Gannon |
| 6,188,026 B1 | 2/2001 | Cope et al. |
| 6,289,928 B1 | 9/2001 | Helms et al. |
| 6,296,920 B1 | 10/2001 | Buehler et al. |
| 6,303,069 B1 | 10/2001 | Anhalt et al. |

(Continued)

FOREIGN PATENT DOCUMENTS

| | | |
|---|---|---|
| CN | 1181776 A | 5/1998 |
| DE | 102008001547 A1 | 11/2008 |

(Continued)

OTHER PUBLICATIONS

International Search Report and Written Opinion issued in PCT/US2013/046258, dated Sep. 25, 2015, 10 pages.
Refreshing Extrusion Technology, Dec. 22, 2014, Retrieved from the Internet: URL: https://extruders.leistritz.com/fileadmin/user_upload/LEX/DE_AT_CH/Downloads/pdf/Leistritz_MASTERBATCH.pdf, retrieeved on Jun. 2, 2016.
Supplemental European Search Report issued in EP Application 13807127, dated Jun. 14, 2016, 14 pages.
International Search Report and Written Opinion issued in PCT/US2016/068390, dated Apr. 10, 2017, 14 pages.
L. Jakisch et al., "Multifunctional Coupling Agents. II. Chain Extension and Termial Group Modification of Polyamides", Journal of Applied Polymer Science, vol. 94, Issue 5, pp. 2170-2177 (2004).

*Primary Examiner* — Edward J Cain
(74) *Attorney, Agent, or Firm* — Faegre Baker Daniels LLP

(57) ABSTRACT

Methods for mixing nylon compounds and compositions useful in mixing nylon compounds are provided. The methods and compositions disclosed are useful in producing nylon for wire and cable jacketing. The disclosed methods provide nylon having a reduced heat history compared to traditional methods. The disclosed methods and composition provide additional mixing capacity by reducing the amount of nylon that must be incorporated with additives per unit of final nylon composition. The disclosed methods and compositions provide the ability to select from a plurality of additive concentration levels in the final product by varying the ratio of a masterbatch compound containing a high concentration of the additive to a resin containing a low concentration or no additive.

17 Claims, 15 Drawing Sheets

(56) References Cited

U.S. PATENT DOCUMENTS

| | | |
|---|---|---|
| 6,362,288 B1 | 3/2002 | Brewer et al. |
| 6,387,519 B1 | 5/2002 | Anderson et al. |
| 6,391,239 B2 | 5/2002 | Helms et al. |
| 6,515,056 B2 | 2/2003 | Treutlein |
| 6,515,058 B1 | 2/2003 | Tomiyama et al. |
| 6,569,931 B2 | 5/2003 | Furukawa et al. |
| 6,610,777 B1 | 8/2003 | Anderson et al. |
| 6,664,299 B2 | 12/2003 | Cook et al. |
| 6,712,997 B2 | 3/2004 | Won et al. |
| 6,730,249 B2 | 5/2004 | Sears et al. |
| 6,942,823 B2 | 9/2005 | Terada et al. |
| 6,964,746 B2 | 11/2005 | Schlosser et al. |
| 6,987,144 B2 | 1/2006 | Anderson et al. |
| 7,151,127 B2 | 12/2006 | Stoeppelmann et al. |
| 7,182,888 B2 | 2/2007 | Terada et al. |
| 7,192,909 B2 | 3/2007 | Richter et al. |
| 7,226,963 B2 | 6/2007 | Koevoets et al. |
| 7,241,403 B2 | 7/2007 | Hossan et al. |
| 7,312,263 B2 | 12/2007 | Schmid et al. |
| 7,390,842 B2 | 6/2008 | Kieser et al. |
| 7,411,129 B2 | 8/2008 | Kummer et al. |
| 7,439,284 B2 | 10/2008 | Alger et al. |
| 7,449,507 B2 | 11/2008 | Fishburn |
| 7,462,656 B2 | 12/2008 | Keulen et al. |
| 7,534,822 B2 | 5/2009 | Elkovitch et al. |
| 7,557,301 B2 | 7/2009 | Kummer et al. |
| 7,598,307 B2 | 10/2009 | Kuehnle et al. |
| 7,749,024 B2 | 7/2010 | Chambers et al. |
| 7,763,674 B2 | 7/2010 | Gijsman et al. |
| 7,846,996 B2 | 12/2010 | Pask et al. |
| 7,902,287 B2 | 3/2011 | Grant et al. |
| 8,026,309 B2 | 9/2011 | Halahmi et al. |
| 8,043,119 B2 | 10/2011 | Kummer et al. |
| 8,066,933 B2 | 11/2011 | Monsheimer et al. |
| 8,158,721 B2 | 4/2012 | Stevenson et al. |
| 8,382,518 B2 | 2/2013 | Chambers et al. |
| 8,383,712 B2 | 2/2013 | David et al. |
| 9,156,982 B2 | 10/2015 | Amici et al. |
| 9,312,047 B2 * | 4/2016 | Facinelli ................ H01B 3/305 |
| 2002/0006998 A1 | 1/2002 | Furukawa et al. |
| 2002/0096356 A1 | 7/2002 | Kim et al. |
| 2002/0145132 A1 | 10/2002 | Won et al. |
| 2003/0064876 A1 | 4/2003 | Greiner et al. |
| 2005/0032943 A1 | 2/2005 | Silvestro et al. |
| 2005/0131126 A1 | 6/2005 | Yang et al. |
| 2006/0065428 A1 | 3/2006 | Kummer et al. |
| 2006/0065430 A1 | 3/2006 | Kummer et al. |
| 2006/0068085 A1 | 3/2006 | Reece et al. |
| 2006/0068086 A1 | 3/2006 | Reece et al. |
| 2006/0088657 A1 | 4/2006 | Reece et al. |
| 2006/0128907 A1 | 6/2006 | Yu |
| 2006/0151196 A1 | 7/2006 | Kummer et al. |
| 2006/0157303 A1 | 7/2006 | Reece et al. |
| 2006/0191621 A1 | 8/2006 | Kummer et al. |
| 2006/0249298 A1 | 11/2006 | Reece et al. |
| 2006/0249299 A1 | 11/2006 | Kummer et al. |
| 2006/0251802 A1 | 11/2006 | Kummer et al. |
| 2007/0072972 A1 | 3/2007 | Kuhnle et al. |
| 2007/0154668 A1 | 7/2007 | Rhee et al. |
| 2007/0238833 A1 | 10/2007 | Leboeuf et al. |
| 2008/0066946 A1 | 3/2008 | Kummer et al. |
| 2008/0318065 A1 | 12/2008 | Sherman et al. |
| 2010/0000784 A1 | 1/2010 | Kummer et al. |
| 2010/0063191 A1 | 3/2010 | Hirano |
| 2010/0113661 A1 | 5/2010 | Senff et al. |
| 2010/0255186 A1 | 10/2010 | Montes et al. |
| 2011/0105697 A1 | 5/2011 | Buhler et al. |
| 2011/0166242 A1 | 7/2011 | Kawaguchi et al. |
| 2011/0172338 A1 | 7/2011 | Murakami et al. |
| 2011/0174521 A1 | 7/2011 | Hernandez-Hernandez et al. |
| 2011/0281984 A1 | 11/2011 | Garois et al. |
| 2012/0009421 A1 * | 1/2012 | Alvarez ................ B29B 9/06 428/402 |
| 2012/0015202 A1 | 1/2012 | Kenens et al. |
| 2012/0041132 A1 | 2/2012 | Monsheimer et al. |
| 2012/0177937 A1 * | 7/2012 | Ogawa ................ C08G 69/26 428/458 |
| 2012/0296036 A1 | 11/2012 | Allen et al. |
| 2013/0193614 A1 | 8/2013 | Perez Gesteira et al. |
| 2014/0084499 A1 | 3/2014 | Harris et al. |

FOREIGN PATENT DOCUMENTS

| | | |
|---|---|---|
| EP | 1813649 A1 | 8/2007 |
| EP | 2113522 A1 | 11/2009 |
| EP | 2157149 A2 | 2/2010 |
| JP | 2004148729 A | 5/2004 |
| WO | 2001079338 A1 | 10/2001 |
| WO | 2002079318 A2 | 10/2002 |
| WO | 2006016895 A1 | 5/2006 |
| WO | 2007032573 A1 | 3/2007 |
| WO | 2007041344 A2 | 4/2007 |
| WO | 2007044999 A1 | 4/2007 |
| WO | 2007081372 A1 | 7/2007 |
| WO | 2011117709 A2 | 9/2011 |
| WO | 2013192150 A1 | 12/2013 |
| WO | 2014126739 A1 | 8/2014 |

* cited by examiner

METHOD AND COMPOSITIONS FOR PRODUCING POLYMER BLENDS

CROSS-REFERENCE TO RELATED APPLICATIONS

This application is a continuation application of U.S. patent application Ser. No. 13/833,490, filed Mar. 15, 2013, which claims the benefit under 35 U.S.C. §119(e) of U.S. Provisional Patent Application Ser. No. 61/663,220 filed Jun. 22, 2012, the disclosures of which are hereby incorporated by reference in their entirety.

FIELD

The present invention relates to methods and apparatus for producing polymer compounds, and in particular for producing nylon compounds suitable for wire and cable jacketing.

BACKGROUND

A coating, or jacket, of nylon is commonly provided outside a polyvinyl chloride ("PVC") coating on metallic wires and cables. The nylon jacket may provide oil resistance, abrasion resistance, and flexibility to the wire or cable product.

The nylon formulation used in wire and cable jacketing typically includes one or more polymers, heat stabilizers, lubricants, and other compounds. In a traditional approach, the entire formulation is compounded in a twin screw extruder to homogeneously incorporate each of the additives into the formed nylon pellets.

Improvements in the foregoing processes are desired.

SUMMARY

The present disclosure provides methods for mixing nylon compounds and compositions useful in mixing nylon compounds. In one embodiment, the methods and compositions disclosed are useful in producing nylon for wire and cable jacketing. In some embodiments, the disclosed methods provide nylon having a reduced heat history compared to traditional methods. In some embodiments, the disclosed methods and composition provide additional mixing capacity by reducing the amount of nylon that must be incorporated with additives per unit of final nylon composition. In some embodiments, the disclosed methods and compositions provide the ability to select from a plurality of additive concentration levels in the final product by varying the ratio of a masterbatch compound containing a high concentration of the additive to a resin containing a low concentration or no additive.

In one exemplary embodiment, a method of producing a mixture having a predetermined concentration of an additive is provided. The method comprises the steps of: providing a first polymer compound, the first polymer compound comprising a polymer resin and a first concentration of the additive, wherein the first concentration is from 0 wt. % to the predetermined concentration; providing a second polymer compound, the second polymer compound comprising the polymer resin and a second concentration of the additive, wherein the second concentration is greater than the predetermined concentration and the first polymer compound polymer resin is identical to the second polymer compound polymer resin; and combining the first and second polymer compounds to achieve a mixture having the predetermined concentration of the additive.

In another exemplary embodiment, a method of producing a masterbatch having a predetermined concentration of an additive is provided. The method comprises the steps of: incorporating the additive into a polymer resin having a melt point at a temperature above the melt point of the polymer resin to produce a first polymer compound having a concentration of the additive greater than the predetermined concentration; pelletizing the first polymer compound to produce a first plurality of pellets; mixing the first plurality of pellets with a second plurality of pellets to produce a pellet mixture, wherein the second plurality of pellets comprises the polymer resin, wherein the pellet mixture comprises the predetermined concentration of the additive.

In still another exemplary embodiment, a masterbatch composition is provided. The masterbatch comprises: a nylon resin having a melt point; one or more heat stabilizers, said one or more heat stabilizers comprising from 0.8 wt. % to 12 wt. % of the masterbatch; one or more lubricants, said one or more lubricants comprising from 1.5 wt. % to 6 wt. % of the masterbatch; wherein the one or more heat stabilizers and one or more lubricants are incorporated into the nylon resin at a temperature above the melt point to form the masterbatch.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 1:
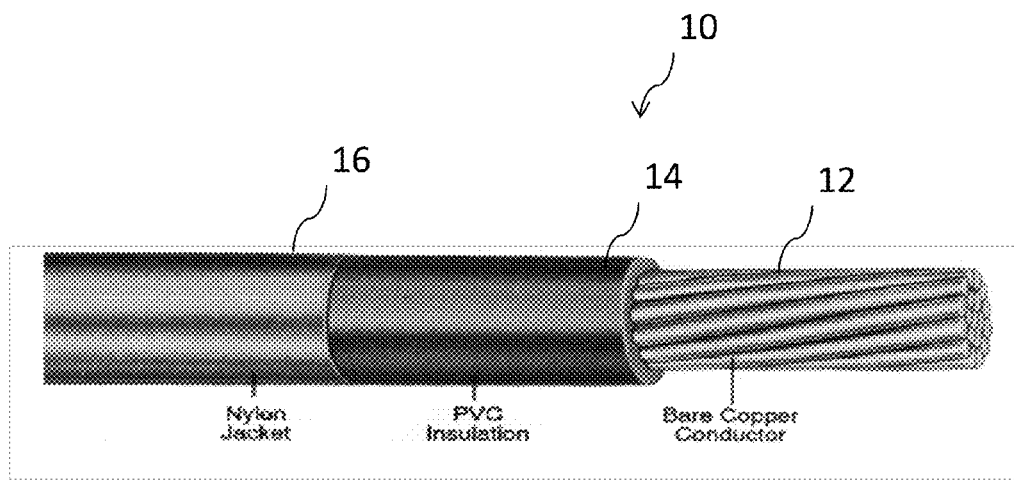
FIG. 1 illustrates an exemplary wire having PVC insulation and nylon coatings.

Although not so limited, the mixing process described herein is particularly useful in forming pellets for use in nylon jacketing of wire and cable. An exemplary jacketed wire 10 is illustrated in FIG. 1. Wire 10 has a conductive core 12, typically of copper. As illustrated, core 12 is surrounded by a layer of insulation 14. An exemplary insulating material is polyvinyl chloride ("PVC"). Insulation layer 14 is further surrounded by an outer protective layer, illustratively nylon jacket 16. In other embodiments, jacketed wire 10 does not include an additional insulating material and nylon jacket 16 is in direct contact with the core 12. Properties associated with nylon jacket 16 include long term heat resistance, flexibility, abrasion resistance, oil resistance, and low coefficient of friction for installing wire 10.

Nylon jacket 16 is formed from a compound comprising a plurality of additives incorporated into a polymer. In one embodiment, nylon jacket 16 has a formula including various target weight percentages of polymers and additives, such as monomers, heat stabilizers, lubricants, anti-wear additives, and other suitable additives. Exemplary polymers include Nylon 6, or polycaprolactam and Nylon 6, 6, or poly(hexamethylene adipamide). Exemplary monomers include caprolactam. Exemplary heat stabilizers include copper iodide, potassium iodide, potassium bromide, sodium iodide, potassium chloride, other copper halides, and other metallic halides. Exemplary lubricants include ethylene bis stearamide ("EBS"), other organic amides, aluminum stearate, zinc stearate, calcium stearate, other metallic stearates, and other metallic fatty acids. Exemplary anti-wear additives include perfluoropolyether, polytetrafluoroethylene, functional and non-functional polydimethylsiloxane, graphite, molybdenum disulfide, and silicone oil. Other suitable additives may also be used.

Figure 2:
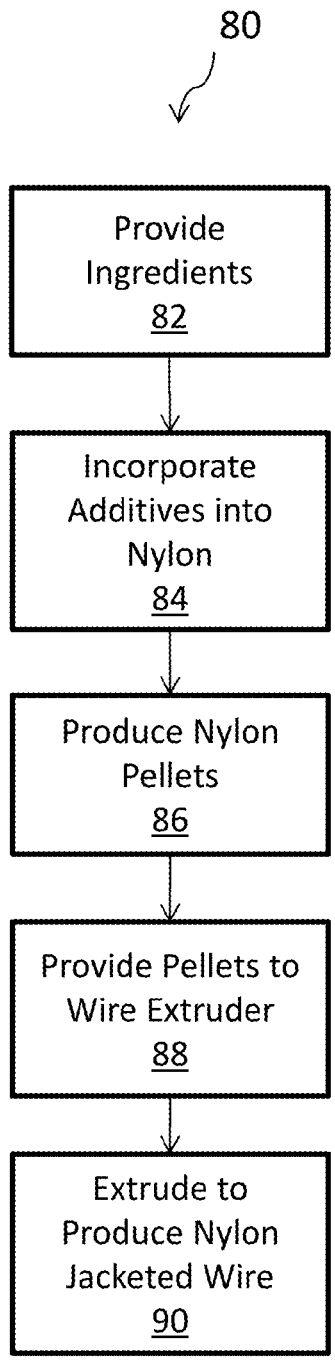
FIG. 2 illustrates an exemplary method of producing nylon jacketed wire.

FIG. 2 illustrates an exemplary method 80 of producing nylon jacketed wire. In step 82, the ingredients to be combined into the desired formulation are provided. Some of the nylon may be provided in a ground powder form to assist in the transport and dispersing of the additives in the mixing process. In one embodiment, about 1% by weight of the overall formulation is provided as ground nylon. In step 84, the ingredients are incorporated into the polymer at a temperature at or above the melt point of the nylon. In one exemplary embodiment, the melt point of nylon 6 is about 220° C. In other embodiments, the melt point may be as low as about 175° C., 180° C., 190° C., 200° C., 210° C., 220° C., 230° C. as high as about 260° C., 270° C., 300° C., 320° C., 350° C., 360° C., or within a range defined between any pair of the foregoing values. Incorporating the additives into the polymer in this way provides a more uniform mix and incorporation of the additives into the polymer, which further provides a more homogenous polymer compound. In one embodiment, step 84 is performed in a twin screw extruder or mixer. In another embodiment, step 84 is performed in a single screw extruder or mixer. Other suitable ways of incorporating the additives into the polymer, including but not limited to Brabender mixers, rollers, kneaders, and mills, may also be used.

Once the additives have been incorporated into the polymer, in step 86 the formulation is then converted into pellets. In step 88, the pellets are provided to an extruder used to produce the jacketed wire. In step 90, the pellets are extruded through a die to form a nylon jacket surrounding the conductive core of the jacketed wire. An insulating layer may also be coated on the conducting core, and the nylon jacket is formed outside the insulating layer, as illustrated in FIG. 1.

Figure 3:
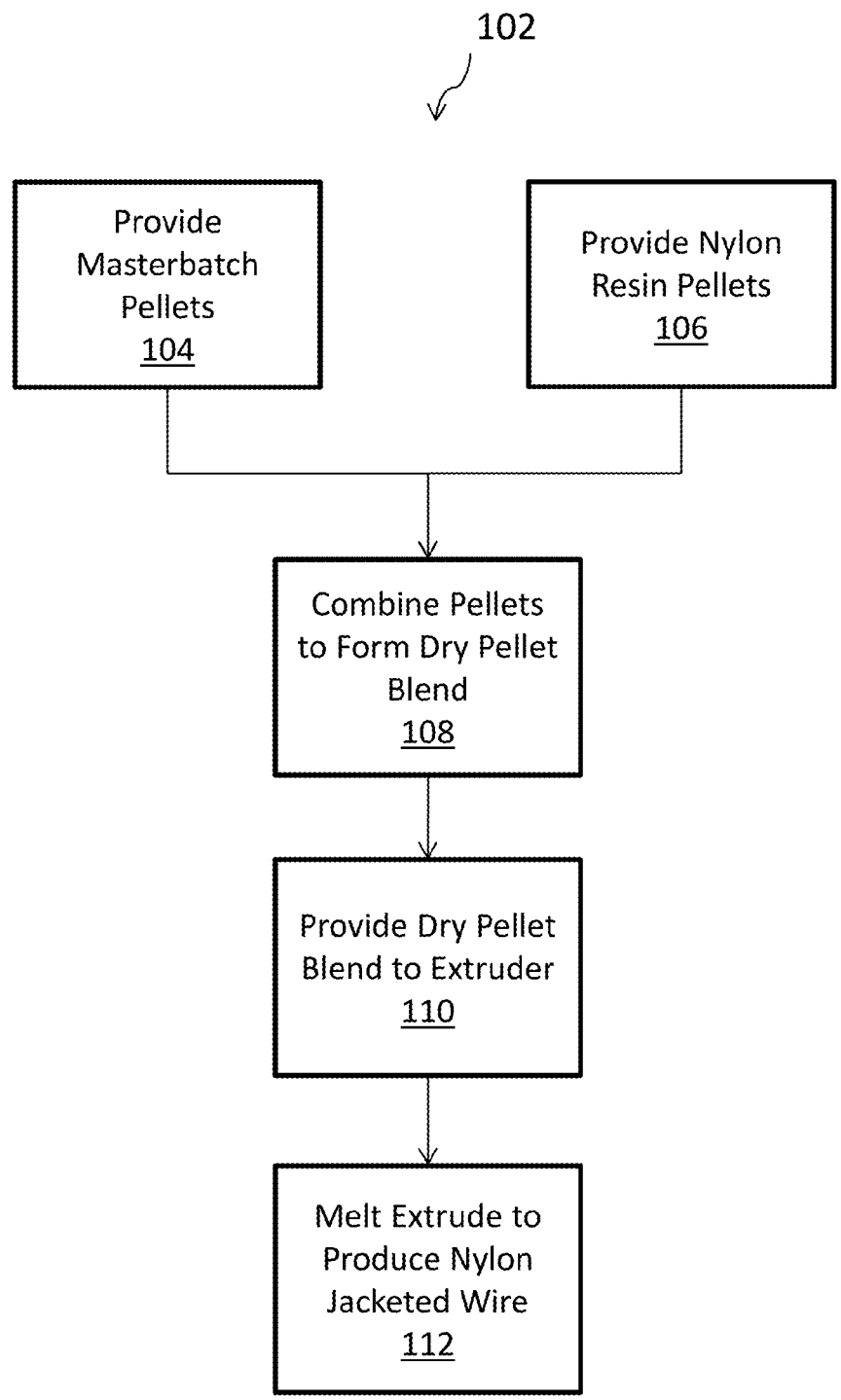
FIG. 3 illustrates another exemplary method of producing nylon jacketed wire.

FIG. 3 illustrates another exemplary method 102 of producing nylon jacketed wire. In step 104, a masterbatch compound in pellet form is provided. The masterbatch compound contains a higher loading of at least one additive compared to the desired final formulation. Exemplary methods of producing masterbatch are described in more detail below with respect to FIGS. 4 and 5. In one embodiment, step 104 comprises providing a first plurality of masterbatch pellets comprising a nylon resin and a first additive and a second plurality of masterbatch pellets comprising a nylon resin and a second additive. In step 106, a nylon resin is also provided in pellet form. In one embodiment, the nylon resin provided in step 106 and the base resin provided in step 122 of method 120 (FIG. 4) or step 142 of method 140 (FIG. 5) are an identical grade of polymer or based from the same manufacturing process. In one embodiment, the nylon resin provided in step 106 and the base resin provided in step 122 or 142 are identical. As used herein, two polymers are identical if they have the same chemical properties such as the same viscosity and the same extractable content. Exemplary resins include nylon 6 resins available from Honeywell International, Morristown, N.J.

In one embodiment, the nylon resin provided in step 106 contains no additives. In one embodiment, the nylon resin provided in step 106 consists essentially of nylon 6. In another embodiment, the nylon resin provided in step 106 contains some additives, but at least one additive in the resin is provided at a lower amount compared to the desired final formulation. In another embodiment, the masterbatch or nylon resin provided in steps 104 and 106 is in a form other than as a pellet.

In step 108, the masterbatch pellets provided in step 104 and the nylon resin pellets provided in step 106 are combined. In step 110, the pellets are provided to the extruder. In one embodiment, steps 108 and 110 are performed as a single step. In this embodiment, the masterbatch pellets and nylon resin pellets are directly provided to the extruder. In another embodiment, steps 108 and 110 are performed as separate steps. In this embodiment, the masterbatch pellets and nylon resin pellets are combined to form a dry pellet blend, and the dry pellet blend is directly provided to the extruder. In one embodiment, the dry pellet blend is mixed or dispersed to increase the homogeneity of the blend between the masterbatch pellets and the nylon resin pellets.

In step 112, the combined pellets are extruded into a nylon jacket covering the outside of a nylon jacketed wire, such as illustrated in FIG. 1.

In one embodiment, the method 102 illustrated in FIG. 3 produces a nylon jacket 16 in step 112 that has a reduced heat history compared to a nylon jacket 16 produced in step 90 of method 80 illustrated in FIG. 2. Referring to FIG. 2, all of the polymer in the final nylon jacket 16 has been heated above its melting point at least twice, once in step 84 to incorporate the additives into the nylon, and again in step 90 when forming the nylon jacket 16. In comparison, referring to FIG. 3, the portion of polymer provided as nylon pellets in step 106 is only heated once, namely, during the formation of the nylon jacket 16, while only the portion provided as masterbatch in step 104 has been previously heated. In an exemplary blend of 20% masterbatch to 80% raw nylon, 20% of the nylon has been heated twice, while 80% of the nylon has been heated only once. In this manner, the embodiment of FIG. 3 may be advantageous, as repeated heating and cooling of the nylon polymer may produce different polymer and crystalline properties, resulting in different properties in the final nylon jacket 16.

Figure 4:
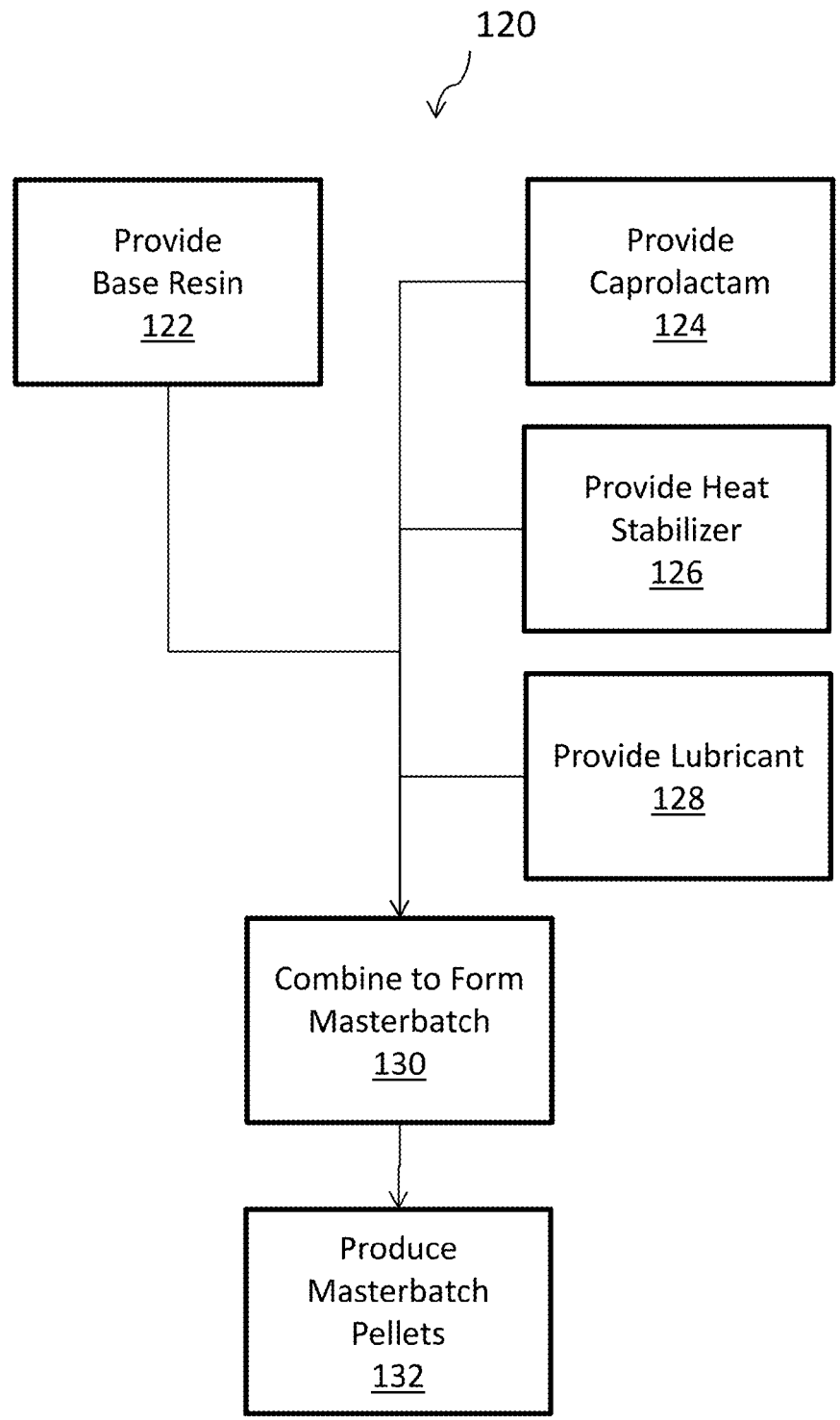
FIG. 4 illustrates an exemplary method of producing masterbatch.

FIG. 4 illustrates an exemplary method 120 of producing masterbatch. In step 122 a base resin is provided. An exemplary base resin is nylon resin that has a solution viscosity of as little as about 45 formic acid viscosity ("FAV"), 48 FAV, 50 VAV, 52 FAV, 55 FAV, or as high as 58 FAV 60 FAV, 62 FAV, 65 FAV, or within a range defined between any pair of the foregoing values as determined by ASTM D789 and dual end-group termination with an extractable content of nylon 6 oligomer of as little as about 1 wt. %, 1.5 wt. %, 2 wt. %, or as great as 2.5 wt. %, 3 wt. %, 3.5 wt. %, 4 wt. % or within a range defined between any pair of the foregoing values as determined by ISO 6427 ("extractable content"), the disclosures of which are hereby incorporated by reference. In one embodiment, the base resin provided in step 122 and the base resin provided in step 106 of method 102 (FIG. 3) are an identical grade of polymer or based from the same manufacturing process. Exemplary resins include nylon 6 resins available from Honeywell International, Morristown, N.J. Some of the nylon may be provided in a ground powder form to assist in the transport and dispersing of the additives in the mixing process. In one embodiment, the weight percent of nylon provided as ground nylon is about the weight percent of the caprolactam provided.

In step 124, additional monomer is provided. An exemplary monomer is caprolactam. In an exemplary embodiment, the quantity of monomer provided in step 124 is from as little as about 8%, 9%, 10%, 11%, 12%, 13%, as greater as to about 14%, 15%, 16%, 17%, 18%, of the desired masterbatch by weight, or within a range defined between any pair of the foregoing values. In step 126, one or more heat stabilizing ingredients are provided. Exemplary heat stabilizers include Exemplary heat stabilizers include copper iodide, potassium iodide, potassium bromide, sodium iodide, potassium chloride, other copper halides, and other metallic halides. In step 128, one or more lubricants are provided. Exemplary lubricants include ethylene bis stearamide ("EBS"), other organic amides, aluminum stearate, zinc stearate, calcium stearate, and other metallic stearates.

In step 130, the ingredients provided in steps 122, 124, 126, and 128 are combined. In one embodiment, step 130 is performed in a twin screw extruder or mixer. In another embodiment, step 130 is performed in a single screw extruder or mixer. Other suitable ways of incorporating the additives into the polymer, including but not limited to Brabender mixers, rollers, kneaders, and mills, may also be used. In one embodiment, the masterbatch is combined at a temperature slightly above the melt temperature of the nylon base resin with a single screw or twin screw extruder. In step 132, the masterbatch produced in step 130 is pelletized.

TABLE 1

Exemplary Masterbatch Formulations

| Ingredient | Target A | A20% | A10% | Target B | B20% | B10% |
|---|---|---|---|---|---|---|
| Nylon resin | 96.58 | 82.90 | 65.88 | 96.62 | 83.10 | 66.20 |
| Caprolactam | 1.80 | 9.00 | 18.00 | 2.80 | 14.00 | 28.00 |
| Heat stabilizers | 1.09 | 5.70 | 10.90 | 0.28 | 1.40 | 2.80 |
| Lubricants | 0.53 | 2.65 | 5.30 | 0.30 | 1.50 | 3.00 |
| Total % | 100 | 100 | 100 | 100 | 100 | 100 |

Exemplary masterbatch formulations are provided in Table 1. The masterbatch formulations A20% and B20% include five times the additives as the formulations Target A and Target B. When the masterbatch formulations A20% and B20% are incorporated with additional nylon resin in a weight ratio of 20% masterbatch to 80% nylon resin, the resulting compound will include the same levels of the additives caprolactam, heat stabilizers, and lubricants as the formulations Target A and Target B. Similarly, the masterbatch formulations A10% and B10% include five times the additives as the formulations Target A and Target B. When the masterbatch formulations A10% and B10% are incorporated with additional nylon resin in a weight ratio of 10% masterbatch to 90% nylon resin, the resulting compound will include the same levels of the additives caprolactam, heat stabilizers, and lubricants as the formulations Target A and Target B.

In one embodiment, the masterbatch and nylon resin may be combined in a weight ratio of masterbatch to nylon resin as little as 2:1, 1:1, 1:2, 3:1, 4:1, 5:1 as great as 9:1, 10:1: 19:1, 20:1, 24:1, 25:1, or within a range defined between any pair of the foregoing values.

In one embodiment, based on the desired target and masterbatch loading, the masterbatch compound may include one or more additives in an amount as little as 0.10 wt. %, 0.30 wt. %, 1 wt. %, or 5 wt. %, or as great as 10 wt. %, 15 wt. %, 20 wt. %, 25 wt. %, 30 wt. %, 33 wt. %, 30 wt. % or 50 wt. %, or within a range defined between any pair of the foregoing values, based on the total weight of the masterbatch. The nylon resin may be present in an amount as little as 50 wt. %, 60 wt. %, 70 wt. %, or as great as 75 wt. %, 80 wt. %, 90 wt. %, 95 wt. %, or 99 wt. %, or within a range defined between any pair of the foregoing values based on the total weight of the masterbatch.

Figure 5:
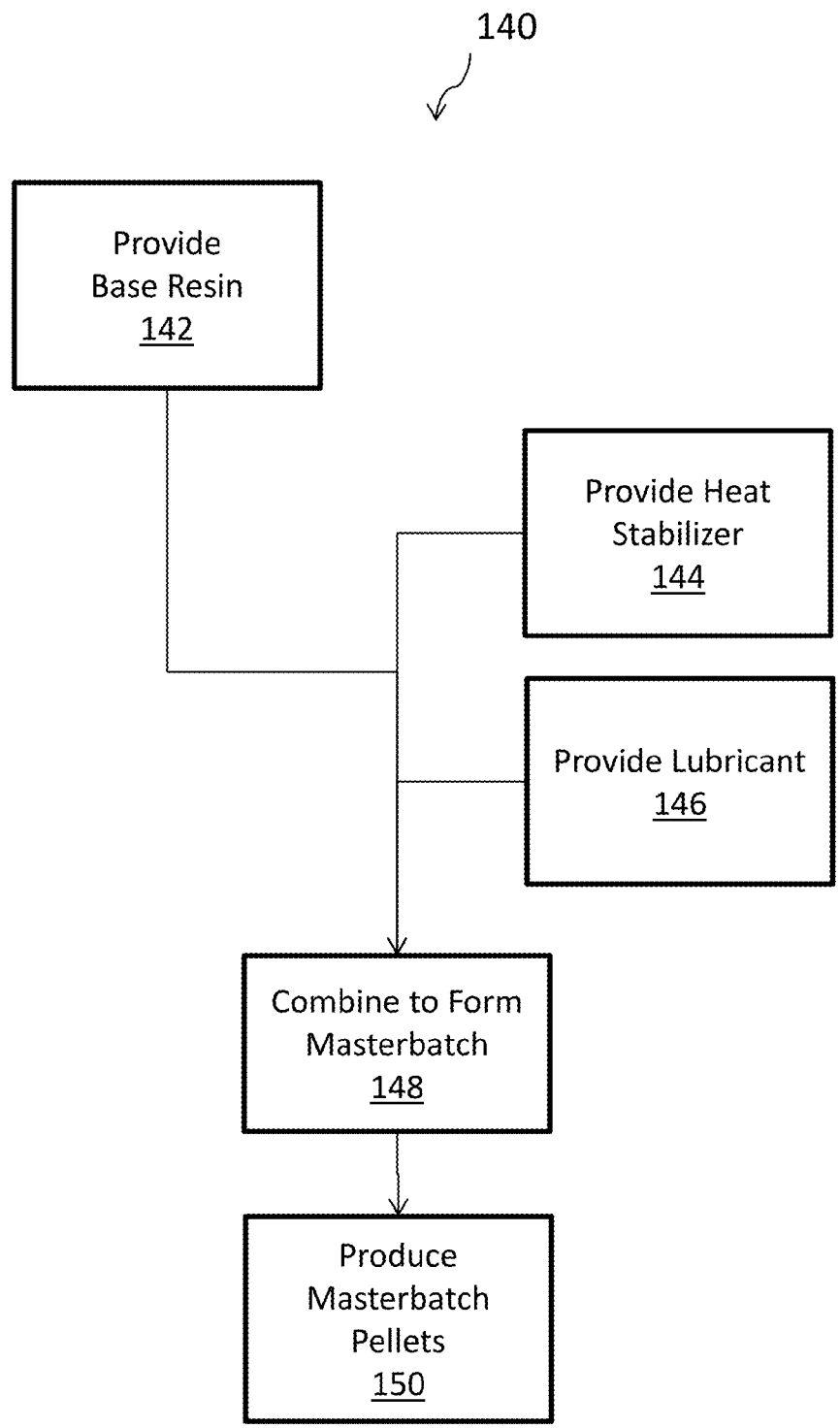
FIG. 5 illustrates another exemplary method of producing masterbatch.

In one embodiment, the additives may be provided in a form consisting essentially of the additive. In another embodiment, the additive may be provided as part of a mixture comprising the additive and a nylon resin. In one embodiment, the mixture is incorporated into the masterbatch, as illustrated in step 130 (FIG. 4) or step 148 (FIG. 5). In another embodiment, the mixture is provided as a second masterbatch and added to a first masterbatch and nylon resin pellets in step 108 (FIG. 3) to achieve a desired final concentration of the additive.

In one embodiment, the masterbatch compound may include one or more heat stabilizers. Exemplary heat stabilizers include copper iodide, potassium iodide, potassium bromide, sodium iodide, potassium chloride, other copper halides, and other metallic halides. The masterbatch compound may include one or more heat stabilizers in a total amount as little as 0 wt. %, 0.1 wt. %, 0.3 wt. %, 0.5 wt. %, 1 wt. %, 1.5 wt. %, 2 wt. %, 2.5 wt. %, 3 wt. %, 4 wt. %, as great as 5 wt. %, 6 wt. %, 7 wt. %, 8 wt. %, 9 wt. %, 10 wt. %, 11 wt. %, 12 wt. %, or within a range defined between any pair of the foregoing values, based on the total weight of the masterbatch.

In one embodiment, the masterbatch compound may include one or more lubricants. Exemplary lubricants include ethylene bis stearamide ("EBS"), other organic amides, aluminum stearate, zinc stearate, calcium stearate, other metallic stearates, and other metallic fatty acids. The masterbatch compound may include one or more lubricants in a total amount as little as 0 wt. %, 0.1 wt. %, 0.3 wt. %, 0.5 wt. %, 1 wt. %, 1.3 wt. %, 1.5 wt. %, 2 wt. %, 2.5 wt. %, as great as 3 wt. %, 4 wt. %, 5 wt. %, 6 wt. %, 7 wt. %, 8 wt. %, or within a range defined between any pair of the foregoing values, based on the total weight of the masterbatch.

In one embodiment, the masterbatch compound may include one or more monomers such as caprolactam or other suitable monomers in a total amount as little as 0 wt. %, 0.5 wt. %, 1 wt. %, 2 wt. %, 5 wt. %, 10 wt. %, 11 wt. %, as great as 15 wt. %, 16 wt. %, 20 wt. %, 25 wt. %, 30 wt. %, or within a range defined between any pair of the foregoing values, based on the total weight of the masterbatch.

In one embodiment, the masterbatch compound may include one or more anti-wear additives. Exemplary lubricants include perfluoropolyether, polytetrafluoroethylene, functional and non-functional polydimethylsiloxane, graphite, molybdenum disulfide, and silicone oil. The masterbatch compound may include one or more anti-wear additives in a total amount as little as 0 wt. %, 0.1 wt. %, 0.3 wt. %, 0.5 wt. %, 1 wt. %, 1.5 wt. %, 2 wt. %, 2.5 wt. %, as great as 3 wt. %, 4 wt. %, 5 wt. % or within a range defined between any pair of the foregoing values, based on the total weight of the masterbatch.

In one embodiment, the masterbatch produced in method 120 is provided as masterbatch pellets in step 104 of method 102. In an exemplary embodiment, the masterbatch pellets provided in step 104 are from about 5% to about 20% by weight of the desired dry pellet blend weight and the nylon resin pellets provided in step 106 are from about 95% to about 80% by weight the desired dry pellet blend weight. In one embodiment, the masterbatch pellets provided in step 104 are present in an amount of as little as 5% by weight, 10% by weight, or 15% by weight, or as great as 20% by weight, 25% by weight, 33% by weight, or 50% by weight, of the desired dry pellet blend weight or within a range defined between any pair of the foregoing values, with the nylon resin pellets comprising the remainder desired dry pellet blend weight.

FIG. 5 illustrates another exemplary method 140 of producing masterbatch. In step 142 a base rein is provided. An exemplary base resin is nylon resin that has a solution viscosity of about as little as 40 FAV, 42 FAV, 45 FAV, 48 FAV, 50 FAV or as high as 54 FAV, 55 FAV, 58 FAV, or 60 FAV, or within a range defined between any pair of the foregoing values, unterminated endgroups, and an extractable content of as little as about 1 wt. %, 1.5 wt. %, 2 wt. %, 2.5 wt. %, 3 wt. %, 3.5 wt. %, 4 wt. %, or as great as 4.5 wt. %, 5 wt. %, 5.5 wt. %, 6 wt. %, or within a range defined between any pair of the foregoing values. In one embodiment, the base resin provided in step 142 and the base resin provided in step 106 of method 102 (FIG. 3) are an identical grade of polymer or based from the same manufacturing process. Exemplary resins include nylon 6 resins available from Honeywell International, Morristown, N.J. Some of the nylon may be provided in a ground powder form to assist in the transport and dispersing of the additives in the mixing process. In one embodiment, the weight percent of nylon provided as ground nylon is about the weight percent of the additives provided.

In step 144, one or more heat stabilizing ingredients are provided. Exemplary heat stabilizers include copper iodide and potassium iodide. In step 146, one or more lubricants are provided. Exemplary lubricants include EBS and aluminum stearate. In step 148, the ingredients provided in steps 142, 144, and 146 are combined. In one embodiment, step 148 is performed in a twin screw extruder or mixer. In another embodiment, step 148 is performed in a single screw extruder or mixer. Other suitable ways of incorporating the additives into the polymer, including but not limited to Brabender mixers, rollers, kneaders, and mills, may also be used. In one embodiment, the masterbatch is combined at a temperature slightly above the melt temperature of the nylon base resin with a single screw or twin screw extruder. In step 150, the masterbatch produced in step 148 is pelletized.

In one embodiment, the masterbatch produced in method 140 is provided as masterbatch pellets in step 104 of method 102. In an exemplary embodiment, the masterbatch pellets provided in step 104 are from about 5% to about 20% by weight of the desired dry pellet blend weight and the nylon resin pellets provided in step 106 are from about 95% to about 80% by weight the desired dry pellet blend weight.

In one embodiment, the nylon resin pellets provided in step 106 of method 102 comprise the same nylon resin as provided in step 122 of method 120. In another embodiment, the nylon resin pellets provided in step 106 of method 102 comprise the same nylon resin as provided in step 142 of method 140.

Example 1—Physical Properties

Two exemplary formulations A and B were compared using wholly compounded and masterbatch mix processes. Formulations in weight percent are given in Table 2. Formulation A was intended as a wholly compounded formulation. Formulation A20% was intended to have five times the level of additives as formulation A, such that when mixed in a ratio of 20% by weight of A20% and 80% by weight of raw pellets, the resulting mixture would have the same level of additives as formulation A. Formulation A10% was intended to have ten times the level of additives as formulation A, such that when mixed in a ratio of 10% by weight of A10% and 90% by weight of raw pellets, the resulting mixture would have the same level of additives as formulation A. Similarly, formulation B was intended as a wholly compounded formulation, and formulations B20% and B10% were intended to have five times and ten times the level of additives, respectfully, as formulation B, such that a mixture with raw nylon pellets in a ratio of 20% by weight of B20% and 80% by weight of raw pellets or 10% by weight of B10% and 90% by weight of raw pellets, the resulting mixture would have the same level of additives as formulation B.

TABLE 2

Exemplary Formulations

| Ingredient | A | A20% | A10% | B | B20% | B10% |
|---|---|---|---|---|---|---|
| Nylon resin pellets (4.5% ext) | 94.88 | 74.40 | 48.88 | 93.92 | 69.60 | 39.20 |
| Caprolactam | 1.80 | 9.00 | 18.00 | 2.80 | 14.00 | 28.00 |
| EBS Wax | 0.01 | 0.05 | 0.10 | 0.10 | 0.50 | 1.00 |
| Potassium Bromide | 0.62 | 3.10 | 6.20 | * | * | * |

TABLE 2-continued

Exemplary Formulations

| Ingredient | A | A20% | A10% | B | B20% | B10% |
|---|---|---|---|---|---|---|
| Potassium Iodide | * | * | * | 0.22 | 1.10 | 2.20 |
| Copper Iodide | 0.47 | 2.35 | 4.70 | 0.06 | 0.30 | 0.60 |
| Zinc Stearate | 0.52 | 2.60 | 5.20 | * | * | * |
| Aluminum Stearate | * | * | * | 0.20 | 1.00 | 2.00 |
| Ground Nylon | 1.70 | 8.50 | 17.00 | 2.70 | 13.50 | 27.00 |
| Total % | 100 | 100 | 100 | 100 | 100 | 100 |
| Concentration Ratio | 1.00 | 5.00 | 10.00 | 1.00 | 5.00 | 10.00 |

The nylon resin pellets had an extractable content of about 4.5% as determined by ISO 6427. Ground nylon was provided in each formulation. The ground nylon was a ground form of the nylon resin pellets, and provided to assist in the transport and dispersing of the other additives in the mixing process. The caprolactam, lubricants, and heat stabilizers were mixed with the ground nylon prior to incorporation with the nylon resin pellets.

Each formulation was prepared using a Liestritz 27 mm extruder. The resulting formulations for A and B were then set aside. Compounds A10%, A20%, B10% and B20% were then mixed with additional nylon resin pellets in the extruder. For compound A10%, 10% by weight of A10% and 90% by weight of additional nylon resin pellets were mixed. For compound A20%, 20% by weight of A20% and 80% by weight of additional nylon resin pellets were mixed. For compound B10%, 10% by weight of B10% and 90% by weight of additional nylon resin pellets were mixed. For compound B20%, 20% by weight of B20% and 80% by weight of additional nylon resin pellets were mixed.

After preparation, each formulation was injection molded into test samples using an Arburg 320S Injection Molding machine. Tensile test samples were prepared according to ISO 527-1 and flexural (3-point bend) samples were prepared according to ASTM D790. The molding conditions are presented in Table 3.

TABLE 3

Molding Conditions

| Formulation | Barrel Temp (° C.) | Nozzle Temp (° C.) | Mold Temp (° C.) | Injection Time (Sec.) | Injection Pressure (bar) | Holding Pressure (bar) | Cooling Time (Sec.) | Cycle Time (Sec.) | Dosage Time (Sec.) | Cushion (ccm) |
|---|---|---|---|---|---|---|---|---|---|---|
| A | 230-260 | 290 | 170 | 0.55 | 529 | 175 | 30.0 | 55.67 | 4.55 | 1.4 |
| B | 230-260 | 290 | 170 | 0.55 | 535 | 175 | 30.0 | 55.67 | 4.66 | 2 |
| A20% | 230-260 | 290 | 170 | 0.55 | 525 | 175 | 30.0 | 55.89 | 3.85 | 2.2 |
| A10% | 230-260 | 290 | 170 | 0.55 | 420 | 175 | 30.0 | 55.75 | 3.71 | 2.2 |
| B20% | 230-260 | 320 | 170 | 0.55 | 517 | 175 | 30.0 | 56.00 | 4.31 | 3.5 |
| B10% | 230-260 | 320 | 170 | 0.55 | 539 | 175 | 30.0 | 56.83 | 3.97 | 3.5 |

After preparation, representative samples of each formulation were tested for tensile strength and tensile according to ISO 527-1 and flexural strength and flexural modulus according to ASTM D790, herein incorporated by reference. For each test, 25 representative dry as molded ("DAM") samples of each formulation were tested. The average and standard deviation for the DAM samples for each test is presented in Table 4.

TABLE 4

DAM Physical Properties Results

| Formulation | Tensile strength (psi) | | Tensile modulus (psi) | | Flexural strength (psi) | | Flexural modulus (psi) | |
|---|---|---|---|---|---|---|---|---|
| | AVG | STD | AVG | STD | AVG | STD | AVG | STD |
| A | 11,700 | 300 | 134,200 | 16,300 | 13,800 | 4,600 | 335,000 | 142,100 |
| A20% | 11,200 | 700 | 156,500 | 4,700 | 13,300 | 300 | 333,000 | 16,800 |
| A10% | 9,100 | 300 | 137,400 | 4,300 | 11,600 | 100 | 300,000 | 10,000 |
| B | 10,200 | 900 | 151,500 | 15,500 | 12,600 | 900 | 315,100 | 86,900 |
| B20% | 10,900 | 300 | 145,700 | 5,400 | 14,900 | 100 | 358,000 | 96,900 |
| B10% | 11,500 | 300 | 153,000 | 3,800 | 17,700 | 400 | 441,000 | 17,300 |

The results given in Table 4 are also presented in FIGS. 6-9. In general, the wholly compound formulations resulted in substantially similar physical properties as the masterbatch samples. The tensile and flexural properties did not appear to be substantially affected by whether the sample had been wholly compounded or prepared from a masterbatch.

Figure 6A:
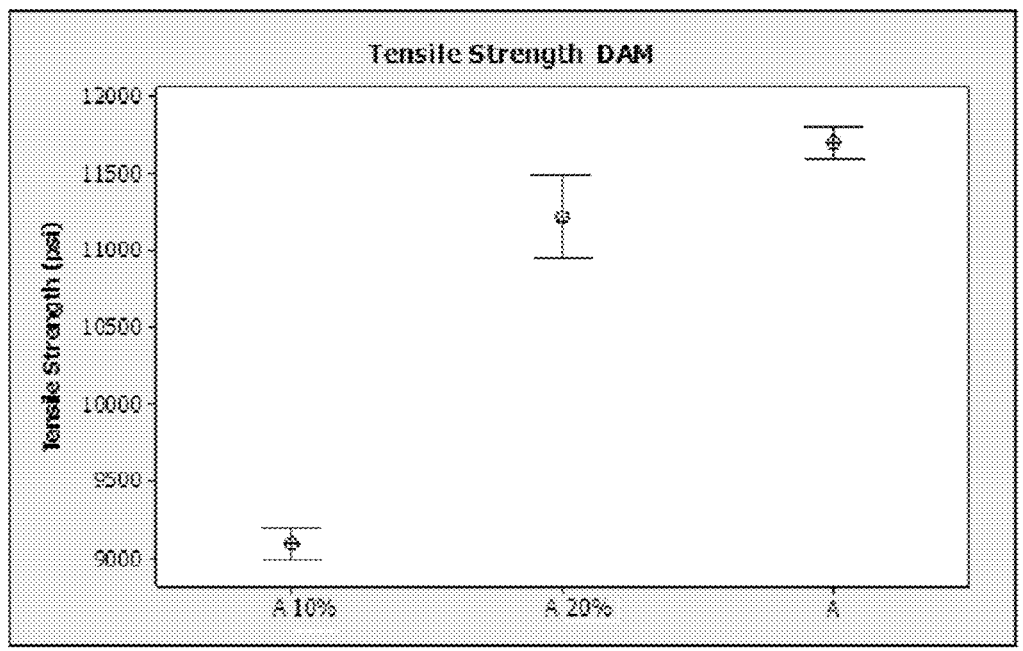
FIG. 6A illustrates DAM tensile strength results.
Figure 6B:
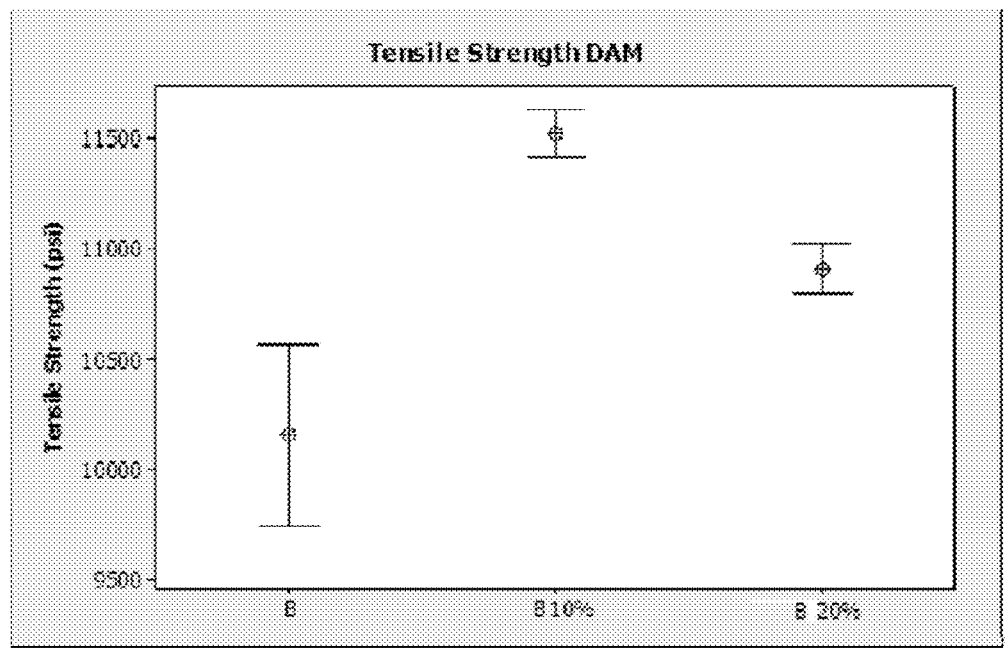
FIG. 6B illustrates dry as molded tensile strength results.

FIGS. 6A and 6B illustrate the DAM tensile strength results. FIG. 6A shows similar tensile strength between the wholly compounded (A) and 20% masterbatch (A20%) samples. FIG. 6B shows higher tensile strength for the B10% and B20% masterbatch samples compared to the wholly compounded (B) samples.

Figure 7A:
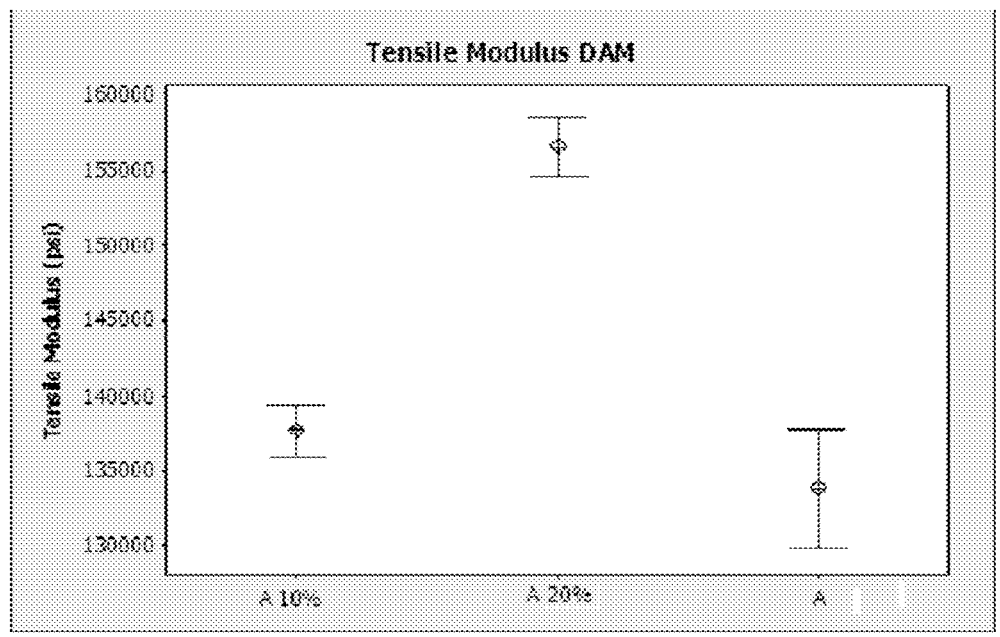
FIG. 7A illustrates DAM tensile modulus results.
Figure 7B:
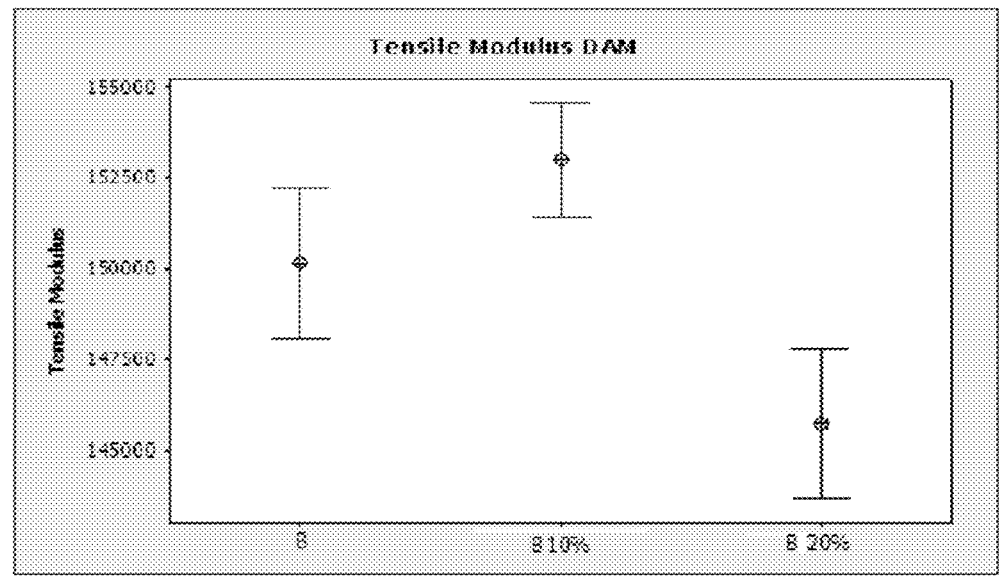
FIG. 7B illustrates dry as molded tensile modulus results.

FIGS. 7A and 7B illustrate the DAM tensile modulus results. FIG. 7A shows similar tensile modulus (modulus of elasticity) between wholly compounded (A) and 10% masterbatch (A10%) samples. FIG. 7B shows similar tensile modulus between wholly compounded (B) and 10% and 20% masterbatch samples.

Figure 8A:
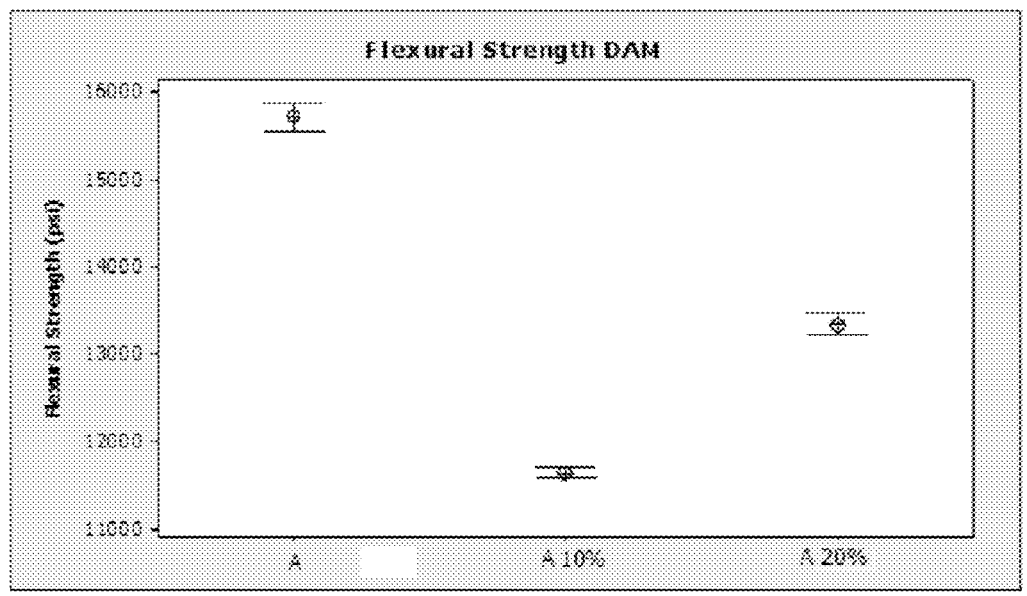
FIG. 8A illustrates dry as molded flexural strength results.
Figure 8B:
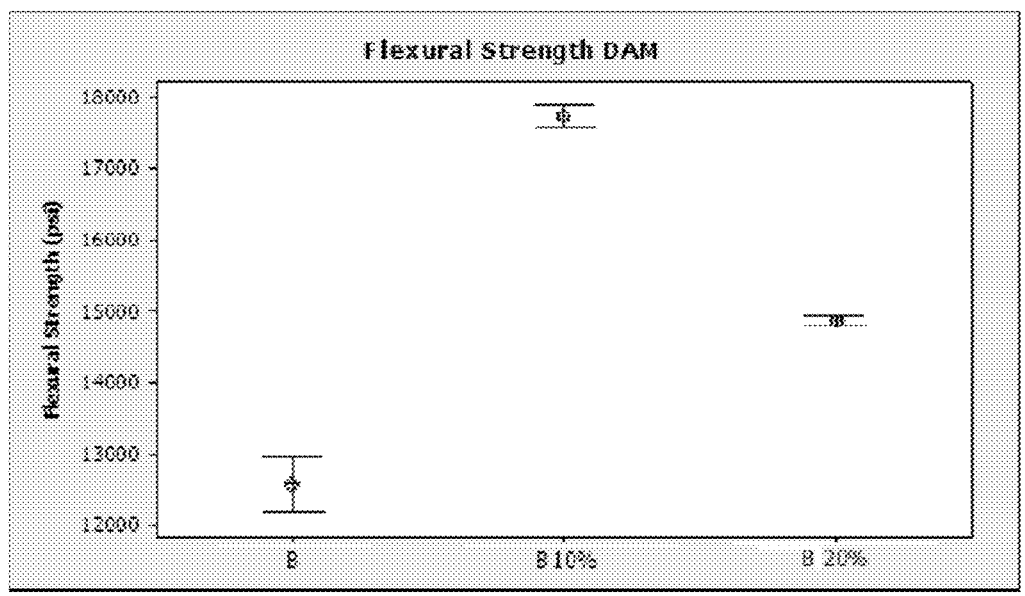
FIG. 8B illustrates dry as molded flexural strength results.

FIGS. 8A and 8B illustrate the DAM flexural strength results. FIG. 8A shows higher flexural strength for the wholly compounded (A) samples compared to the A10% and A20% masterbatch samples. FIG. 8B shows higher flexural strength for the B10% and B20% masterbatch samples compared to the wholly compounded (B) samples.

Figure 9A:
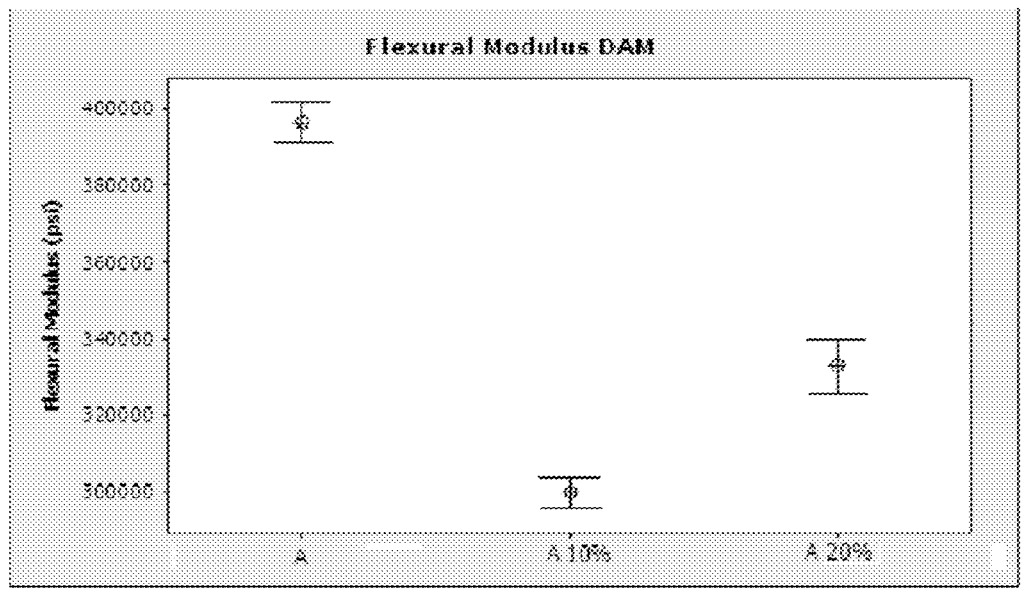
FIG. 9A illustrates dry as molded flexural modulus results.
Figure 9B:
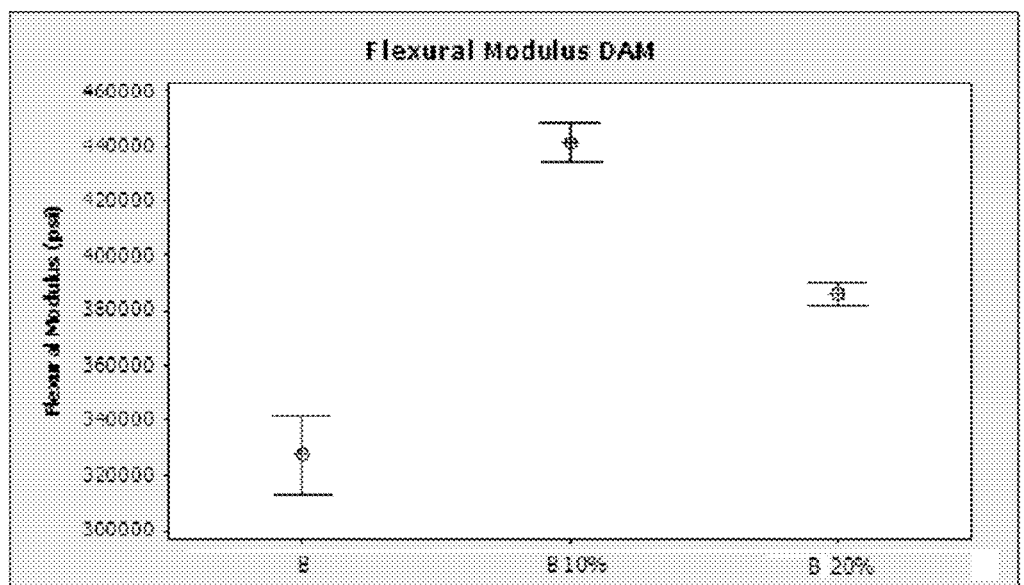
FIG. 9B illustrates dry as molded flexural modulus results.

FIGS. 9A and 9B illustrate the DAM flexural modulus results. FIG. 9A shows higher flexural modulus for the wholly compounded (A) samples compared to the A10% and A20% masterbatch samples. FIG. 9B shows higher flexural modulus for the B10% and B20% masterbatch samples compared to the wholly compounded (B) samples. Representative samples of each formulation were conditioned to a moisture level, of about 2.6%, obtained by the equilibration of nylon at 23 C and 50% relative humidity, and the physical testing repeated on the conditioned samples. Physical properties of nylon compounds are often dependent upon the level of moisture in the formulation. The conditioned values may be more representative of conditions of use. For each test, 25 conditioned samples of each formulation were tested. The average and standard deviation for the conditioned samples for each test is presented in Table 5.

The results given in Table 5 are also presented in FIGS. 10-13. In general, the wholly compound formulations resulted in substantially similar physical properties as the masterbatch samples. The tensile and flexural properties did not appear to be substantially affected by whether the sample had been wholly compounded or prepared from a masterbatch.

Figure 10A:
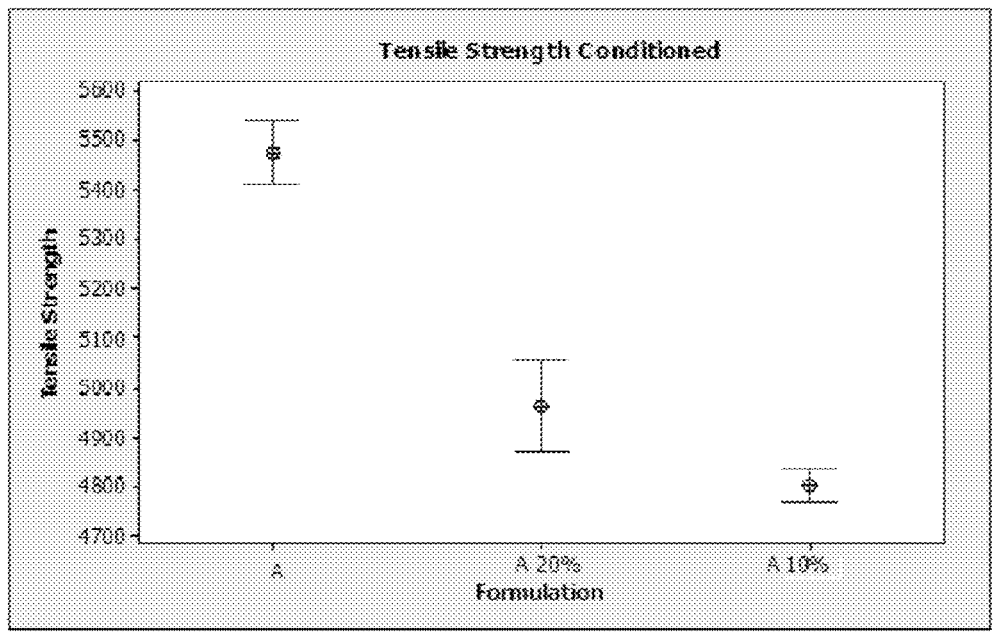
FIG. 10A illustrates conditioned tensile strength results.
Figure 10B:
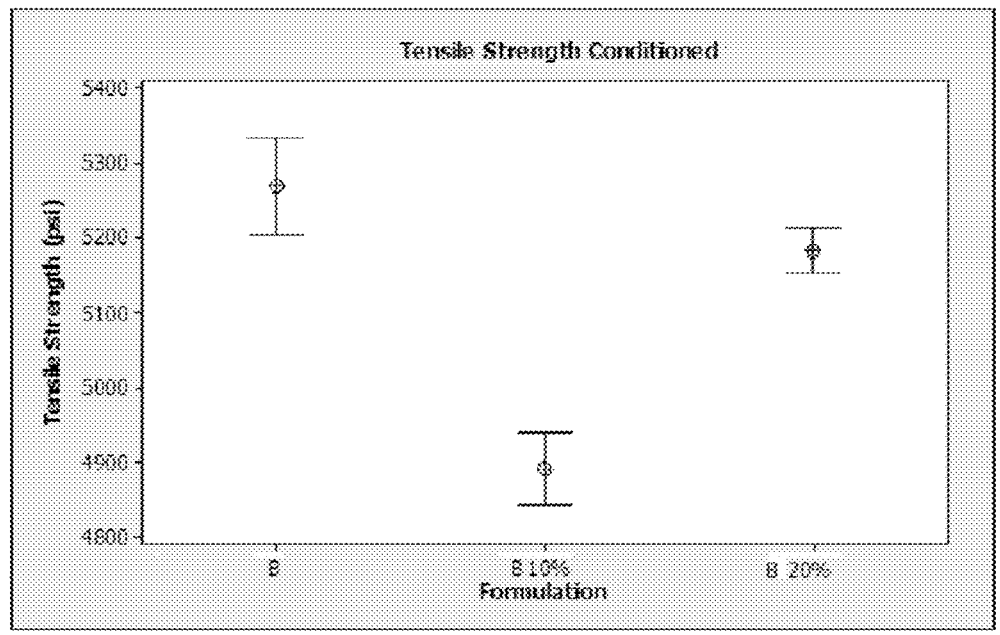
FIG. 10B illustrates conditioned tensile strength results.

FIGS. 10A and 10B illustrate the conditioned tensile strength results. FIG. 10A shows higher tensile strength for the wholly compounded (A) samples compared to the A10% and A20% masterbatch samples. FIG. 10B shows higher tensile strength for the wholly compounded (B) samples compared to the B10% and B20% masterbatch samples.

Figure 11A:
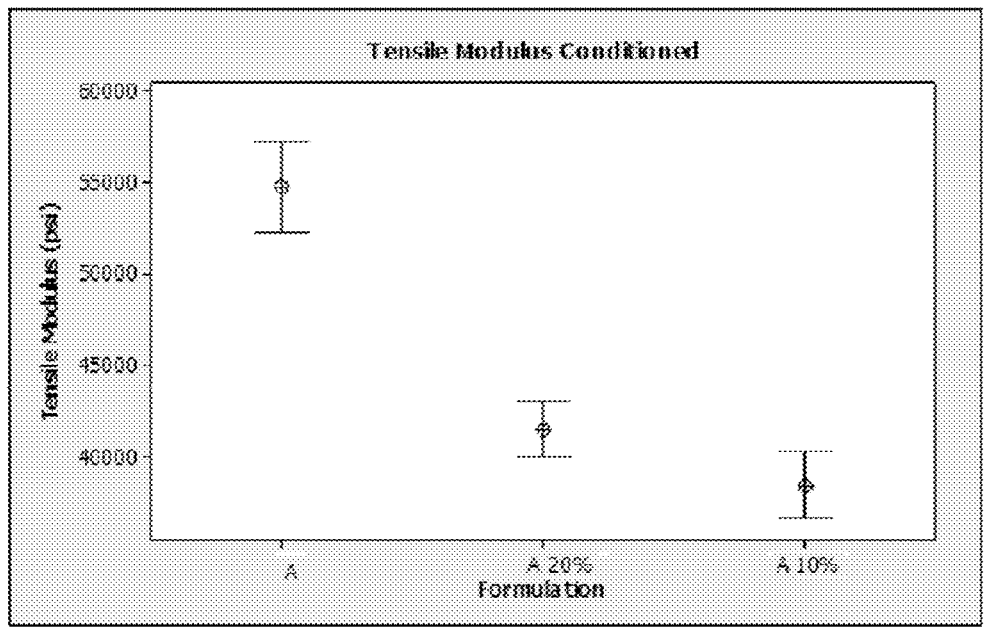
FIG. 11A illustrates conditioned tensile modulus results.
Figure 11B:
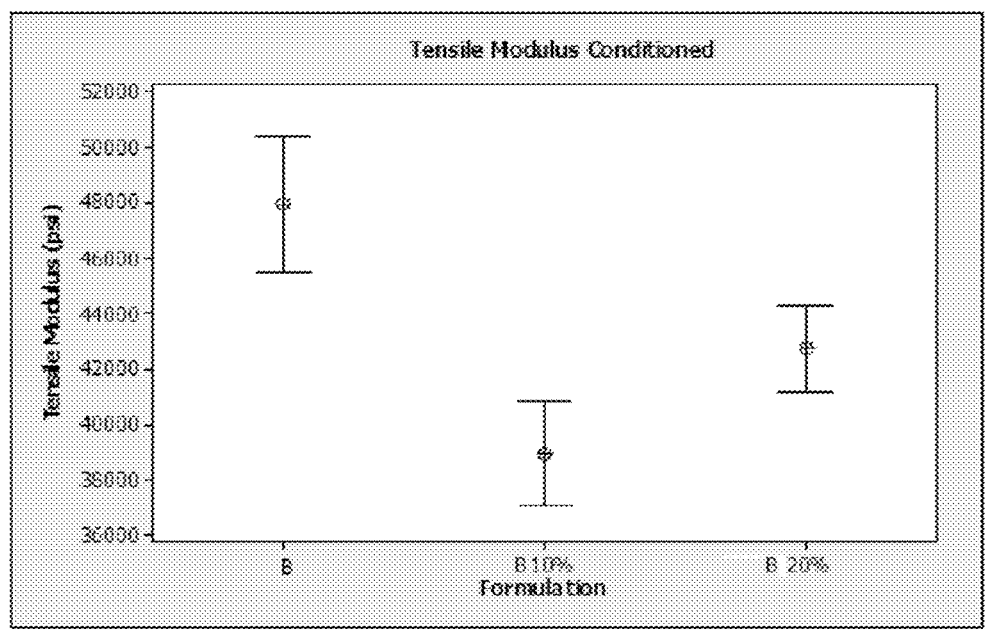
FIG. 11B illustrates conditioned tensile modulus results.

FIGS. 11A and 11B illustrate the conditioned tensile modulus results. FIG. 11A shows higher tensile modulus for the wholly compounded (A) samples compared to the A10% and A20% masterbatch samples. FIG. 10B shows higher tensile modulus for the wholly compounded (B) samples compared to the B10% and B20% masterbatch samples.

Figure 12A:
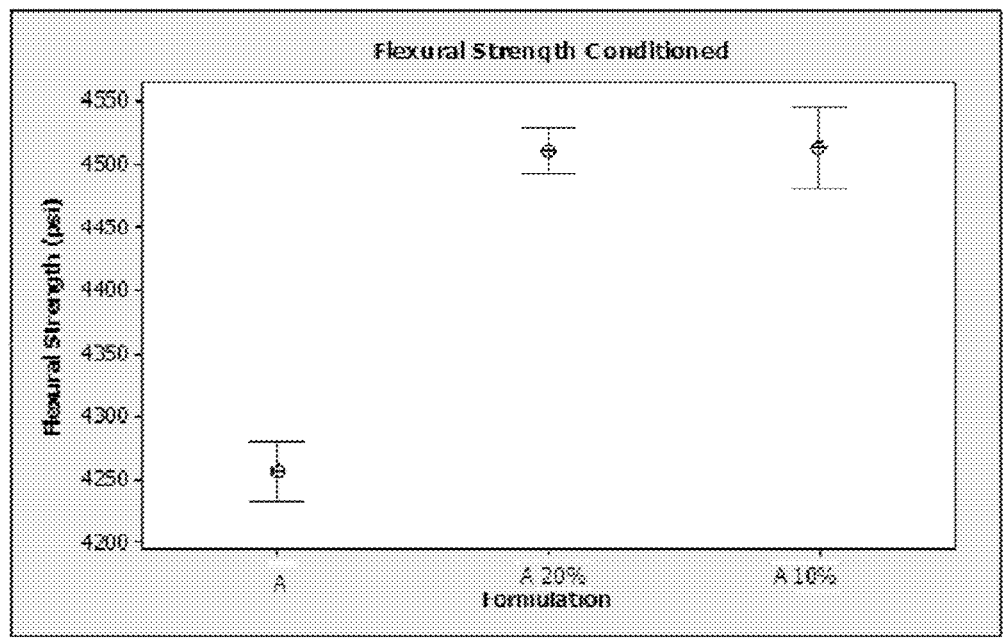
FIG. 12A illustrates conditioned flexural strength results.
Figure 12B:
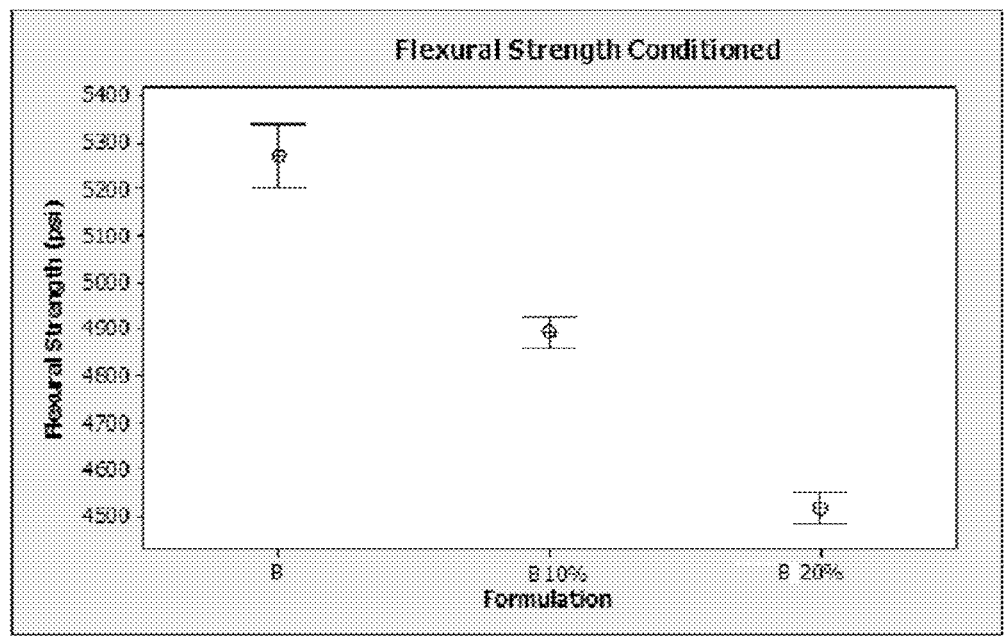
FIG. 12B illustrates conditioned flexural strength results.

FIGS. 12A and 12B illustrate the conditioned flexural strength results. FIG. 12A shows higher flexural strength for the wholly compounded (A) samples compared to the A10% and A20% masterbatch samples. FIG. 10B shows higher flexural strength for the B10% and B20% masterbatch samples compared to the wholly compounded (B) samples.

Figure 13A:
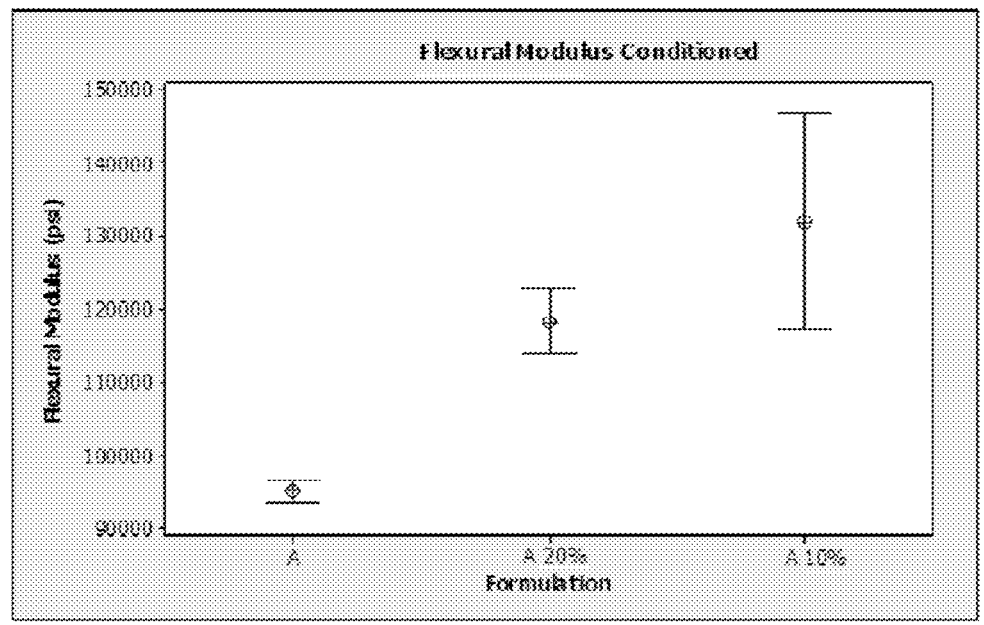
FIG. 13A illustrates conditioned flexural modulus results.
Figure 13B:
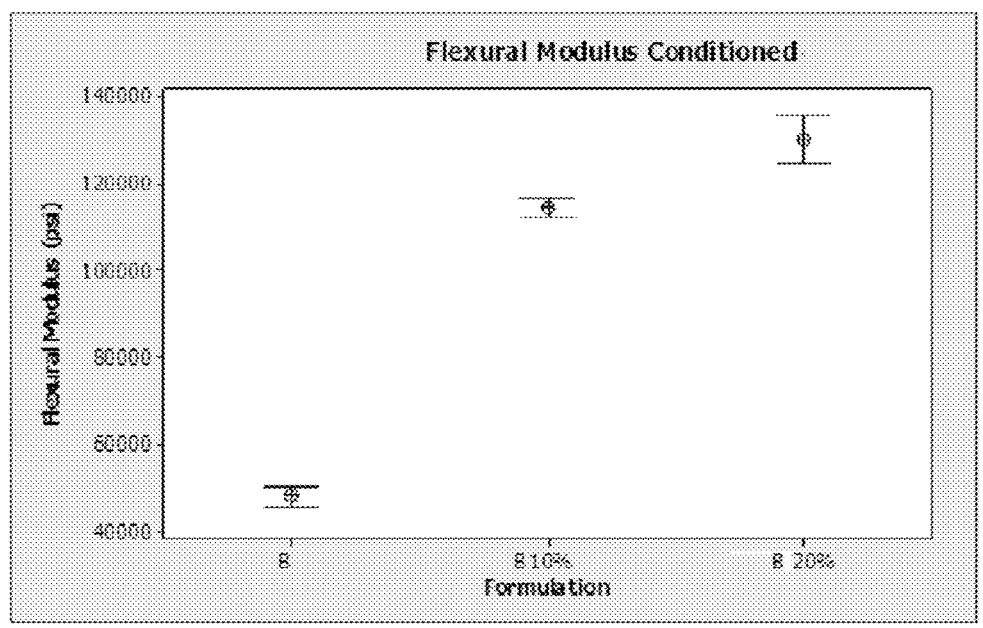
FIG. 13B illustrates conditioned flexural modulus results.

FIGS. 13A and 13B illustrate the conditioned flexural modulus results. FIG. 13A shows higher flexural modulus for the A10% and A20% masterbatch samples compared to the wholly compounded (A) samples. FIG. 10B shows higher flexural modulus for the B10% and B20% masterbatch samples compared to the wholly compounded (B) samples.

Example 2—Processing Feasibility

Processing data for wholly compounded samples A and B and masterbatch compounded samples A20%, A10%, B10%, and B5% are presented in Table 6.

TABLE 5

Conditioned Physical Property Results

| Formulation | Tensile strength (psi) | | Tensile modulus (psi) | | Flexural strength (psi) | | Flexural modulus (psi) | |
| --- | --- | --- | --- | --- | --- | --- | --- | --- |
| | AVG | STD | AVG | STD | AVG | STD | AVG | STD |
| A | 5,400 | 200 | 54,800 | 6,000 | 4,200 | 60 | 95,000 | 3,700 |
| A20% | 5,000 | 200 | 41,500 | 3,700 | 4,500 | 40 | 118,000 | 11,000 |
| A10% | 4,800 | 80 | 38,000 | 4,300 | 4,500 | 80 | 132,000 | 35,900 |
| B | 5,300 | 200 | 47,900 | 5,900 | 3,800 | 80 | 118,400 | 4,900 |
| B20% | 5,200 | 80 | 42,700 | 3,800 | 4,500 | 80 | 130,000 | 12,700 |
| B10% | 4,900 | 120 | 39,000 | 4,500 | 4,900 | 80 | 114,500 | 5,400 |

TABLE 6

Processing Trial Results

| Sample | Melt Temp (° C.) | Melt Pressure (psi) | Through- put Set (lbs/hr) | Through- put Actual (lbs/hr) | Screw Speed Set (rpm) | Screw Speed Actual (rpm) |
|---|---|---|---|---|---|---|
| A | 265 | 120-130 | 30 | 30 | 200 | 200 |
| A20% | 262 | 90 | 20 | 20 | 200 | 200 |
| A10% | 259 | 70 | 20 | 20 | 200 | 200 |
| B | 265 | 120-130 | 30 | 30 | 200 | 200 |
| B5% | 259 | 80 | 20 | 20 | 200 | 200 |
| B10% | 256 | 70 | 20 | 20 | 200 | 200 |

As shown in Table 6, in general, the wholly compound formulations resulted in substantially similar processing properties as the masterbatch samples. The masterbatch samples resulted in lower melt temperatures and pressures than the wholly compounded samples, which may be the result of the higher concentrations of lubricant in the masterbatch compounds. Both wholly compounded and masterbatch samples achieved their respective throughput set points.

Example 3—Production Trial

Two development samples were run on a trial production run of material. The trial produced 14 gauge solid copper thermoplastic high heat-resistant nylon-coated (THHN) wire employing PVC insulation and nylon jacketing suitable for use in UL QMTT2 nylon component certification testing. The copper diameter was approximately 0.06", with an approximately 0.016" thick PVC insulation layer and 0.0042" nylon layer applied.

The production trials were run with two different sets of nylon pellets. The first formation was designed to be a wholly compounded mix. The first formulation was mixed in the standard procedure in which the nylon, caprolactam, and additives were incorporated together in a twin-screw extruder.

The second compound was designed to be a masterbatch mix. The second formulation was a mix of 20% masterbatch pellets and 80% raw nylon pellets. The masterbatch contained five times the additives and caprolactam as the wholly compounded material. The masterbatch and raw nylon pellets were blended together in a ration of 4 parts by weight of raw nylon to 1 part by weight of masterbatch prior to extrusion.

The production trial used a single-screw extruder 2.5 inches in diameter, 24/1 L/D ratio. The trial was run at a line rate of 1400 feet per minute.

Limited monomer off-gassing was observed at the die for the second formulation, but no interference with downstream measurement devices was observed. No differences in processability or product were observed between the first and second formulations.

Example 4—Average Molecular Weight Testing

Gel permeation chromatography columns using high-performance liquid chromatography were used to compare the molecular weights of the wholly compounded and masterbatch mixed stocks. A first formulation was mixed as a wholly compounded mix. The second compound was mixed as a masterbatch mix, comprising a mix of 20% masterbatch pellets and 80% raw nylon pellets. The masterbatch contained five times the additives and caprolactam as the wholly compounded material. The masterbatch and raw nylon pellets were blended together in a ratio of 4 parts by weight of raw nylon to 1 part by weight of masterbatch prior to extrusion.

Three samples of each compound were prepared by mixing 10±1 mg of sample in powder form with 10 mL of chloroform and 504 of trifluoroacetic acid. The samples were shaken for 16 hours at room temperature to bring the sample components into solution with a VWR Digital Vortex Mixer. Each sample was filtered through a 0.22 µm pore diameter membrane filter and transferred to an auto-sampler vial.

The samples were tested using Waters Alliance HPLC with 2695 Separation Module and 2489 UV-Visible Detector with 2 Agilent PLgel 5 µm MIXED-C columns (7.5 mm*300 mm) in series. The column temperature was 25° C., and chloroform was used as the mobile phase with a 1.0 mL/min flow rate. An injection volume of 100 µL was used. A UV-Visible detector for 254 nm was used over the 30 minute run time to determine the molecular weight distribution of each sample.

Figure 14A:
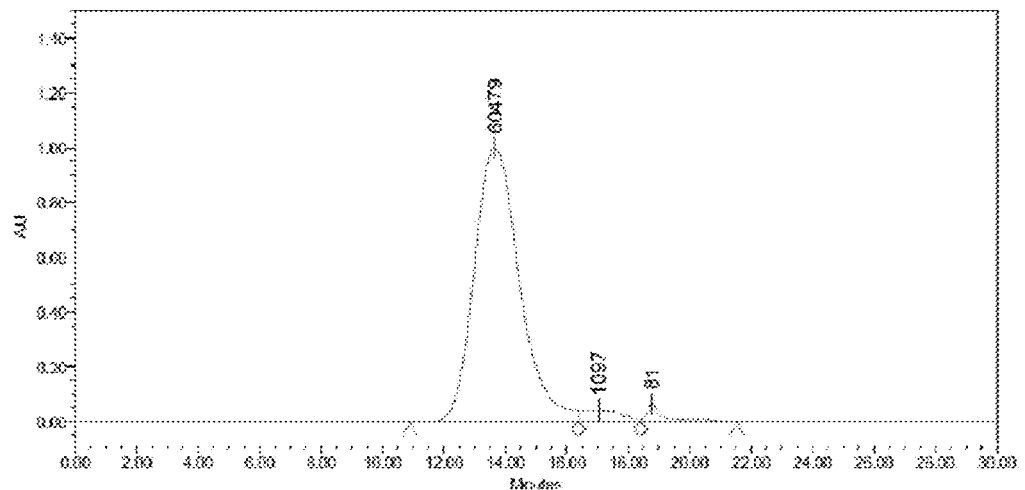
FIG. 14A illustrates comparisons of gel-permeation column chromatography results of a wholly compounded and masterbatch mixed nylon sample.
Figure 14B:
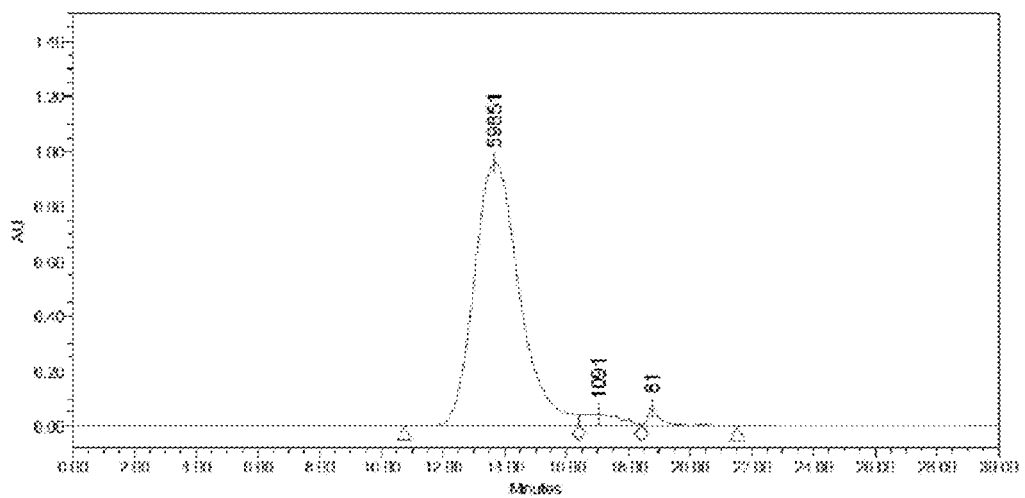
FIG. 14B illustrates gel-permeation column chromatography results of a masterbatch mixed nylon sample.
Figure 14C:
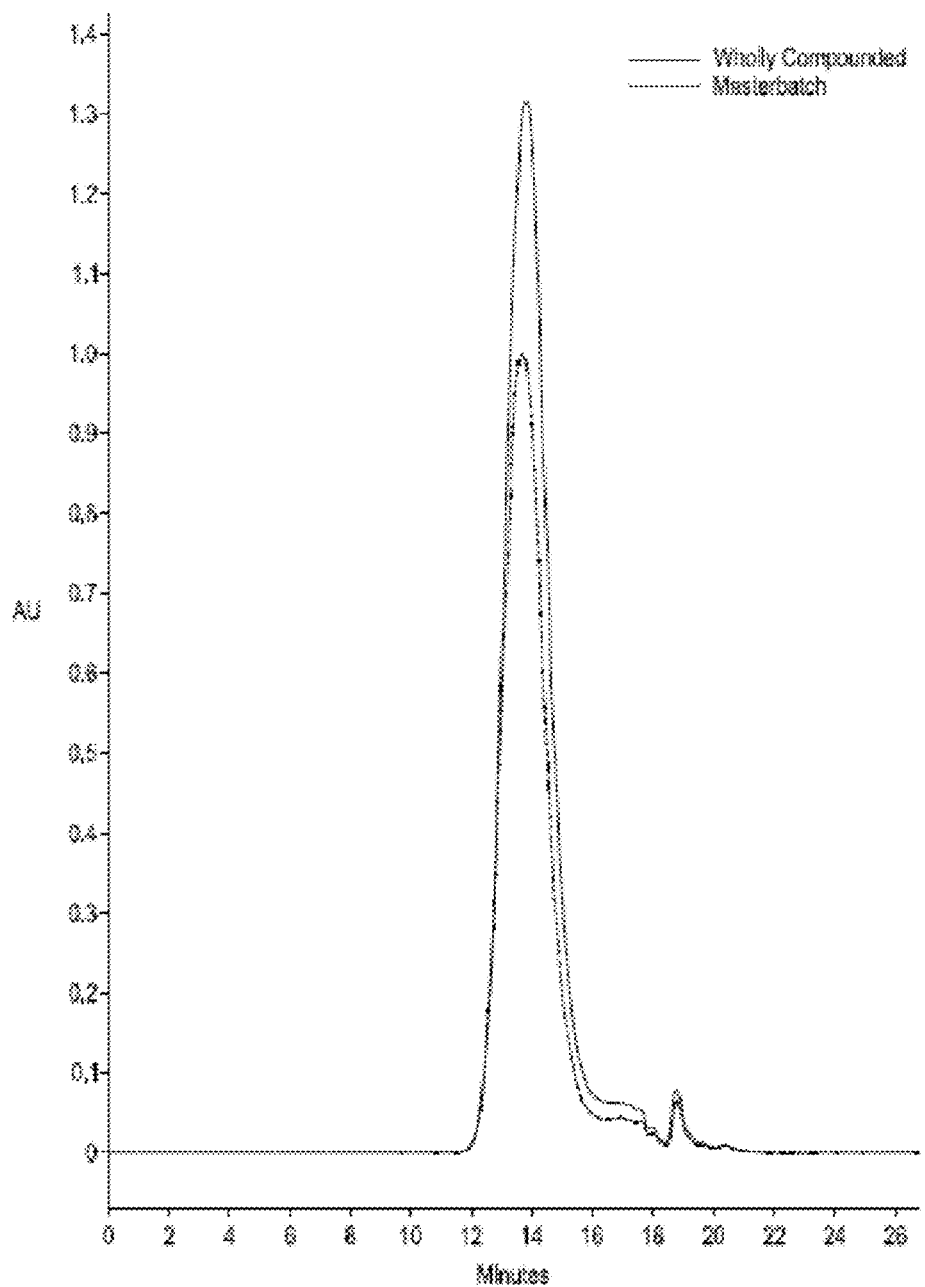
FIG. 14C is an overlay of the gel-permeation column chromatography results of FIGS. 14A and 14B.

The GPC chromatograph for the wholly compounded sample is presented in FIG. 14A. The GPC chromatograph for the masterbatch mixed sample is presented in FIG. 14B. An overlay of the results is presented in FIG. 14C. As shown in FIG. 14C, the molecular weight distribution was substantially similar for the wholly compounded and masterbatch mixed samples.

Example 5—Properties of Wires Coated with Wholly Compounded and Masterbatch Mixed Nylon Wire jacketed with PVC insulation and wholly compounded nylon was compared to wire jacketed with PVC insulation and masterbatch mixed nylon using Underwriters Laboratory UL83 QMTT2 Certification Testing.

A first sample wire was produced using 14 AWG solid copper, type THHN/THWN employing 11.9 mils minimum PVC insulation and a minimum thickness dimension of the nylon of 3.7 mils of a first nylon formulation that was mixed as a wholly compounded mix. A second sample wire was produced using 14 AWG solid copper, type THHN/THWN employing 11.6 mils minimum PVC insulation and a minimum thickness dimension of the nylon of 3.6 mils of a second nylon formulation that was mixed as a masterbatch mix, comprising a mix of 20% masterbatch pellets and 80% raw nylon pellets. The masterbatch contained five times the additives and caprolactam as the wholly compounded material. The masterbatch and raw nylon pellets were blended together in a ratio of 4 parts by weight of raw nylon to 1 part by weight of masterbatch prior to extrusion.

The tensile strength and elongation of the PVC insulation of the two sample wires were tested following the full assembly being conditioned in various fluids at various temperatures per UL 1581, 4th edition. The tensile strength and modulus of each conditioned sample was compared to the tensile strength and modulus of an original non-conditioned sample. The results can be found in Table 7. Generally, a higher result is desirable.

TABLE 7

Processing Trial Results

| | Wholly Compounded | | Masterbatch Mixed | |
|---|---|---|---|---|
| Conditioning Environment | % Original Tensile Strength | % Original Elongation | % Original Tensile Strength | % Original Elongation |
| IRM 902 Oil, 96 hr, 100° C. | 96.6% | 77.8% | 106% | 95.8% |
| IRM 902 Oil, 60 day, 75° C. | 98% | 79.6% | 108% | 95.8% |
| ASTM Reference Fuel C, 30 day, 23° C. | 88.6% | 86.8% | 98% | 100% |

A sample of each wire was conditioned at −25° C. for 4 hours then turned 4 times around a 0.312 in mandrel. No cracks, splits, tears, or circumferential depressions were visible for either sample. A sample of each wire was conditioned 7 days at 136° C., then returned to room temperature and turned 4 times around a 0.312 in mandrel. No cracks, splits, tears, or circumferential depressions were visible for either sample. A sample of each wire was conditioned 1 hour at 121° C., then turned 4 times around a 0.125 in mandrel. No cracks, splits, tears, or circumferential depressions were visible for either sample.

A sample of each wire was loaded with 500 grams and conditioned 1 hour at 136° C. Generally, a lower result is desirable. The wholly compounded sample had a deformation of 10%, while the masterbatch mixed sample had a deformation of 5%.

Ten replicates of each wire were subjected to increasingly higher force until a short circuit occurred. Generally, a higher required force is desirable. The wholly compounded sample had an average required force of 228 pounds, while the master batch mixed sample had an average required force of 238 pounds.

While the present disclosure is primarily directed to mixing nylon formulations for wire and cable jacketing, it should be understood that the features disclosed herein may have application to the mixing processes of other formulations.

While this invention has been described as relative to exemplary designs, the present invention may be further modified within the spirit and scope of this disclosure. Further, this application is intended to cover such departures from the present disclosure as come within known or customary practice in the art to which this invention pertains.

What is claimed is:

1. A method of producing a mixture having a predetermined concentration of an additive comprising the steps of:
    providing a first polymer compound, the first polymer compound comprising a polymer resin and a first concentration of the additive, wherein the first concentration is from 0 wt. % to the predetermined concentration;
    providing a second polymer compound, the second polymer compound comprising the polymer resin and a second concentration of the additive, wherein the second concentration is greater than the predetermined concentration and the first polymer compound polymer resin is identical to the second polymer compound polymer resin; and
    combining the first and second polymer compounds to achieve a mixture having the predetermined concentration of the additive;
    wherein the additive is an anti-wear additive selected from the group consisting of perfluoropolyether, polytetrafluoroethylene, functional and non-functional polydimethylsiloxane, graphite, molybdenum disulfide, and silicone oil.

2. The method of claim 1, wherein the second concentration is from 0.1 wt. % to 5 wt. %, based on the total weight of the second polymer compound.

3. The method of claim 1, further comprising the step of extruding the mixture to form a polymer jacket around a conducting core, wherein the polymer jacket comprises the predetermined concentration of the additive.

4. The method of claim 3, wherein said extruding step further includes forming the polymer jacket around an insulating layer surrounding the conductive core.

5. The method of claim 1, wherein the first polymer resin consists essentially of the polymer resin.

6. The method of claim 1, wherein the mixture has a predetermined concentration of a second additive, and the second polymer compound comprises a second additive in a concentration greater than the predetermined concentration of the second additive.

7. The method of claim 6, wherein the second additive is a lubricant selected from the group consisting of ethylene bis stearamide, metallic stearates, and metallic fatty acids.

8. The method of claim 6, wherein the second additive is a heat stabilizer selected from the group consisting of metallic halides.

9. The method of claim 1, wherein said combining step comprises combining the first and second polymer compounds in a weight ratio of from 1:1 to 9:1.

10. The method of claim 1, wherein the mixture further has a predetermined concentration of caprolactam and said incorporating step includes incorporating the caprolactam into the polymer resin, the first polymer compound has a concentration of the caprolactam greater than the predetermined concentration of the caprolactam, and the mixture comprises the predetermined concentration of caprolactam.

11. A method of producing a masterbatch having a predetermined concentration of an additive, said method comprising the steps of:
    incorporating the additive into a polymer resin having a melt point at a temperature above the melt point of the polymer resin to produce a first polymer compound having a concentration of the additive greater than the predetermined concentration;
    pelletizing the first polymer compound to produce a first plurality of pellets; and
    mixing the first plurality of pellets with a second plurality of pellets to produce a pellet mixture, wherein the second plurality of pellets comprises the polymer resin, wherein the pellet mixture comprises the predetermined concentration of the additive;
    wherein the additive is an anti-wear additive selected from the group consisting of perfluoropolyether, polytetrafluoroethylene, functional and non-functional polydimethylsiloxane, graphite, molybdenum disulfide, and silicone oil.

12. The method of claim 11, wherein the concentration of the additive in the first polymer compound is from 0.1 wt. % to 5 wt. %, based on the total weight of the first polymer compound.

13. The method of claim 11, wherein said mixing step further comprises mixing the first plurality of pellets with the second plurality of pellets in a weight ratio from 1:1 to 9:1.

14. The method of claim 11, further comprising extruding the pellet mixture to form a polymer jacket around a conducting core, wherein the polymer jacket comprises the predetermined concentration of the additive.

15. The method of claim 11, wherein the masterbatch further has a predetermined concentration of a second additive, said incorporating step includes incorporating the second additive into the polymer resin and the first polymer compound has a concentration of the second additive greater than the predetermined concentration of the second additive, and the pellet mixture comprises the predetermined concentration of the second additive;
  wherein the second plurality of pellets consist essentially of nylon 6.

16. The method of claim 11, wherein the masterbatch further has a predetermined concentration of caprolactam and said incorporating step includes incorporating the caprolactam into the polymer resin, the first polymer compound has a concentration of the caprolactam greater than the predetermined concentration of the caprolactam, and the pellet mixture comprises the predetermined concentration of caprolactam.

17. A masterbatch comprising:
  a nylon resin having a melt point;
  one or more heat stabilizers, said one or more heat stabilizers comprising from 0.8 wt. % to 12 wt. % of the masterbatch;
  one or more lubricants, said one or more lubricants comprising from 1 wt. % to 6 wt. % of the masterbatch;
  one or more anti-wear additives selected from the group consisting of perfluoropolyether, polytetrafluoroethylene, functional and non-functional polydimethylsiloxane, graphite, molybdenum disulfide, and silicone oil comprising from 0.1 wt. % to 5 wt. % of the masterbatch; and
  caprolactam, the caprolactam comprising 0.5 wt. % to 30 wt. % of the masterbatch.

* * * * *